(12) United States Patent
Lindner et al.

(10) Patent No.: US 7,064,234 B2
(45) Date of Patent: Jun. 20, 2006

(54) ENANTIOSELECTIVE CATION-EXCHANGE MATERIALS

(76) Inventors: Wolfgang Lindner, Ziegelofengasse 37, Klosterneuburg, A-3400 (AT); Michael Lammerhofer, Neustiftgasse 66/1/3, Wien, A-1070 (AT)

( * ) Notice: Subject to any disclaimer, the term of this patent is extended or adjusted under 35 U.S.C. 154(b) by 0 days.

(21) Appl. No.: 10/503,689

(22) PCT Filed: Feb. 14, 2003

(86) PCT No.: PCT/AT03/00046

§ 371 (c)(1),
(2), (4) Date: Aug. 4, 2004

(87) PCT Pub. No.: WO03/068397

PCT Pub. Date: Aug. 21, 2003

(65) Prior Publication Data

US 2005/0131087 A1    Jun. 16, 2005

(30) Foreign Application Priority Data

Feb. 15, 2002   (AT) ............................... A 240/2002

(51) Int. Cl.
*C07F 9/28*    (2006.01)
*C07C 309/00*    (2006.01)

(52) U.S. Cl. .......................... 562/14; 562/44

(58) Field of Classification Search .................. 562/14, 562/44
See application file for complete search history.

(56) References Cited

U.S. PATENT DOCUMENTS

| | | | |
|---|---|---|---|
| 4,318,819 A | 3/1982 | Malloy | |
| 4,519,955 A | 5/1985 | Chibata | |

FOREIGN PATENT DOCUMENTS

| | | |
|---|---|---|
| GB | 1007665 A | 10/1965 |

OTHER PUBLICATIONS

Tobler et al, Electrophoresis, Low-molecular-weight Chiral Cation Exchangers: Novel Chiral Stationary Phases and Their Application for Enantioseparation of Chiral Bases by Nonaqueous Capillary Electrochromatography, Feb. 3, 2002, 23, pp. 462-476.*
"Microscale Synthesis and Screening of Chiral Stationary Phases" by Christopher J. Welch et al., Enantiomer, vol. 3, 1998, pp. 471-476.
"High-Performance Liquid Chromatography of Human Hemoglobins on a New Cation Exchanger" by Ching-Nan Ou et al., Journal of Chromatography, vol. 266, 1983, pp. 197-205.

"Enantiomer separation of amino compounds by a novel chiral stationary phase derived from crown ether" by Yoshio Machida et al., Journal of Chromatography A, vol. 805, 1998, pp. 85-92.
"Enantioselective separation of reacemic secondary amines on a chiral crown ether-based liquid chromatography stationary phase" by Robert J. Steffeck, Journal of Chromatography A, vol. 947, 2002, pp. 301-305.
"Evaluation of silica gel-based brush type chiral cation exchangers with (S) -N- (3,5-dinitrobenzoyl) tyrosine as chiral sector: attempt to interpret the discouraging results" by E. Veigl et al., Journal of Chromatography A, vol. 694, 1995, pp. 151-161.
"Low-molecular-weight chiral cation exchangers: Novel chiral stationary phases and their application for enantioseparation of chiral bases by nonaqueous capillary electrochromatography" by Ernst Tobler et al., Electrophoresis, vol. 23, 2002, pp. 1-15.
"Recent developments in liquid chromatographic enantioseparation" by Michael Lammerhofer et al., IN: Handbook of Analytical Separations, vol. 1: Separation methods in drug synthesis and purification (ed: K. Valko), pp. 337-437.
"Quinine and quinidine derivatives as chiral selectors I. Brush type chiral stationary phases for high-performance liquid chromatography based on cinchonan carbamates and their application as chiral anion exchangers" by Michael Lammerhofer et al., Journal of Chromatography A, vol. 741, 1996, pp. 33-48.
"Quinine versus carbamoylated quinine-based chiral anion exchangers A comparison regarding enantioselectivity for N-Protected amino acids an other chiral acids" by Alexandra Mandl et al., Journal of Chromatography A, vol. 858, 1999, pp. 1-11.
"Enantioselective Anion Exchagers Based on Cinchona Alkaloid-Derived Carbamates: Influence of $C_8/C_9$ Sterochemistry on Chiral Recognition" by Norbert M. Maier et al., Chirality, vol. 11, 1999, pp. 522-528.
"High-efficiency chiral separations of N-derivatized amino acids by packed-capillary electrochromatography with a quinine-based chiral anion-exchange type stationary phase" by Michael Lammerhofer et al., Journal of Chromatography A, vol. 829, 1998, pp. 115-125.

(Continued)

*Primary Examiner*—Paul A. Zucker
(74) *Attorney, Agent, or Firm*—Birch, Stewart, Kolasch & Birch, LLP

(57) ABSTRACT

The present invention relates to an enantioselective cation-exchange material, comprising a chiral selector (1), composed of a chiral component (2) and at least one cation-exchange group (X), a spacer (3) and a carrier (4). The cation-exchange material is characterized in that the chiral component (2) has a molecular weight of less than 1,000 and the at least one cation-exchange group (X) is an acid group having a pKa<4.0.

14 Claims, 1 Drawing Sheet

OTHER PUBLICATIONS

"Chiral Monolithic Column for Enantioselective Capillary Electrochromatography Prepared by Copolymerization of a Monomer with Quinidine Functionality. I. Optimization of Polymerization Conditions, Porous Properties, and Chemistry of the Stationary Phase" by Michael Lammerhofer et al., Analytical Chemistry, vol. 72, No. 19, Oct. 1, 2000, pp. 4614-4622.

"Broad Spectrum Resolution of Optical Isomers Using Chiral High-Performance Liquid Chromatographic Bonded Phases" by William H. Pirkle et al., Journal of Chromatography, vol. 192, 1980, pp. 143-158.

"Reciprocity in Chiral Recognition Comparison of Several Chiral Stationary Phases" by William H. Pirkle et al., Journal of Chromatography, vol. 404, 1987, pp. 107-115.

"Note on the use of reciprocity of chiral recognition in designing liquid chromatographic chiral stationary phases" by Myung Ho Hyun et al., Journal of Chromatography A, vol. 922, 2001, pp. 119-125.

"Ion-Pair Chromatography in Enantiomer Separations" by Curt Pettersson et al., A practical approach to chiral separations by liquid chromatography, G. Subramanian (ed.), VHC. Weinheim, 1994, pp. 279-310.

"Chiral selectors with chelating properties in liquid chromatography: fundamental reflections and selective review of recent developments" by Vadim A. Davankov, Journal of Chromatography A, vol. 666, 1994, pp. 55-76.

"Chiral chromatographic separations based on ligand exchange" by Alexander Kurganov, Journal of Chromatography A, vol. 906, 2001, pp. 51-71.

"Liquid chromatographic resolution of racemic amino acids and their derivatives on a new chiral stationary phase based on crown ether" by Myung Ho Hyun, Journal of Chromatography A, vol. 822, 1998, pp. 155-161.

"Nuclear magnetic resonance studies for the chiral recognition of the novel chiral stationary phase derived from 18-crown-6 tetracarboxylic acid" by Yoshio Machida et al., Journal of Chromatography A, vol. 810, 1998, pp. 33-41.

"Direct Liquid Chromatographic Separation of Enantiomers on Immobilized Protein Stationary Phases" by Stig Allenmark, Journal of Chromatograpy, vol. 264, 1983, pp. 63-68.

"Synthesis and Chromatographic Properties of an HPLC Chiral Stationary Phase Based upon Human Serum Albumin" by E. Domenici et al., Chromatographia, vol. 29, No. 3/4, Feb. 1990, pp. 170-176.

"Direct Liquid Chromatographic Resolution of Reacemic Drugs Using $\alpha_1$-Acid Glycoprotein as the Chiral Stationary Phase" by Jorgen Hermansson, Journal of Chromatography, vol. 269, 1983, pp. 71-80.

"Application of an ovomucoid-conjugated column for the optical resolution of some pharmaceutically important compounds" by Toshinobu Miwa et al., Journal of Chromatography, vol. 408, 1987, pp. 316-322.

"Protein-based chiral stationary phases for high-performance liquid chromatography enantioseparations" by Jun Haginaka, Journal of Chromatography A, vol. 906, 2001, pp. 253-273.

"A Sulfated Cyclodextrin Chiral Stationary Phase for High-Performance Liquid Chromatography" by Apryll M. Stalcup et al., Analytical Chemistry, vol. 68, No. 8, Apr. 15, 1996, pp. 1369-1374.

"Chiral separations using macrocyclic antibiotics: a review" by Timothy J. Ward et al., Journal of Chromatography A, vol. 906, 2001, pp. 73-89.

"Macrocyclic Antibiotics as a new Class of Chiral Selectors for Liquid Chromatography" by Daniel W. Armstrong et al., Analytical Chemistry, vol. 66, No. 9, May 1, 1994, pp. 1473-1484.

"A Convalently Bonded Teicoplanin Chiral Stationary Phase for HPLC Enantioseparations" by Daniel W. Armstrong et al., Chirality, vol. 7, 1995, pp. 474-497.

"Highly Enantioselective HPLC Separations Using the Convalently Bonded Macrocyclic Antibiotic, Ristocetin A, Chiral Stationary Phase" by K. Helen Ekborg-Ott et al., Chirality, vol. 10, 1998, pp. 434-483.

"Chiral ion-exchange chromatography Correlation between solute retention and a theoretical ion-exchange model using imprinted polymers" by Borje Sellergren et al., Journal of Chromatography A, vol. 654, 1993, pp. 17-28.

"Imprinted chiral stationary phrases in high-performance liquid chromatography" by Borje Sellergren, Journal of Chromatography A, vol. 906, 2001, pp. 227-252.

"High-performance liquid chromatography chiral stationary phases based on low-molecular-mass selectors" by Francesco Gasparrini et al., Journal of Chromatography A, vol. 906, 2001, pp. 35-50.

"Evolution of chiral stationary phase design in the Pirkle laboratories" by Christopher J. Welch, Journal of Chromatography A, vol. 666, 1994, pp. 3-26.

"Chromatographic Separation of the Enantiomers of 2-charboalkoxyindolines and N-Aryl-$\alpha$-Amino Esters on Chiral Stationary Phases Derived from N-(3, 5-Dinitrobenzoyl)-$\alpha$-Amino Acids" by William H. Pirkle et al., Journal of Chromatography, vol. 348, 1985, pp. 89-96.

"Separation of the enantiomers of N-protected $\alpha$-amino acids as anilide and 3,5-dimethylanilide derivatives" by William H. Pirkle et al., Journal of Chromatography, vol. 479, 1989, pp. 419-423.

"An improved Chiral Stationary Phase for the Facile Separation of Enantiomers" by William H. Pirkle et al., Journal of Chromatography, vol. 441, 1988, pp. 311-322.

"Useful and Easily Prepared Chiral Stationary Phases for the Direct Chromatographic Separation of the Enantiomers of a Variety of Derivatized Amines, Amino Acids, Alcohols, and Related Compounds" by William H. Pirkle, et al., Journal Org. Chem, vol. 51, 1986, pp. 4491-5000.

"High-Speed Chiral Separation of Beta-Blockers by Supercritical Fluid Chromatography on ChyRoSine-A" by N. Bargmann-Leyder et al., Chromatographia, vol. 39, No. 11/12, Dec. 1994, pp. 673-681.

"Supercritical Fluid Chromatographic Separation of $\beta$-Blockers on Chyrosine-A: Investigation of the Chiral Recognition Mechanism Using Molecular Modeling" by N. Bargmann-Leyder et al., Analytical Chemistry, vol. 67, No. 5, Mar. 1, 1995, pp. 952-958.

"Direct enantiomer separation by high-performance liquid chromatography with chiral urea derivatives as stationary phases" by Naobumi Oi et al., Journal of Chromatography A, vol. 694, 1995, pp. 129-134.

"Chiral stationary phase designed for $\beta$-blockers" by W.H. Pirkle et al., Journal of Chromatography, vol. 557, 1991, pp. 173-185.

"Enantiomer separation by gas and high-performance liquid chromatography with tripeptide derivatives as chiral stationary phases" by Naobumi Oi, et al. Journal of Chromatography A, vol. 722, 1996, pp. 229-232.

"New 1,3,5-triazine based chiral stationary phase for the high-performance liquid chromatographic separation of enantiomers" by Anna Iuliano et al., Journal of Chromatography A, vol. 786, 1997, pp. 355-360.

"Quantitative fast fractionation of a pool of polyclonal antibodies by immunoaffinity membrane chromatiography" by Galina A. Platonova et al., Journal of Chromatography A, vol. 852, 1999, pp. 129-140.

"In situ preparation of peptidylated polymers as read-to-use adsorbents for rapid immunoaffinity chromatography" by V.I. Korol'kov et al., Letters in Peptide Science, vol. 7, 2000, pp. 53-61.

"Affinity Monoliths Generated by In Situ polymerization of the Ligand" by R. Hahn et al., Analytical Chemistry, vol. 73, No. 21, Nov. 1, 2001, pp. 5126-5132.

"Enzymes in organic chemistry. Part 9:[1] Chemo-enzymatic synthesis of phosphonic acid analogues of L-valine, L-leucine, L-isoleucine, L-methionine and L-α-aminobutyric acid of high enantiomeric excess" by Friedrich Hammerschmidt et al., Tetrahedron: Asymmetry, vol. 10, 1999, pp. 1709-1721.

Veigl E. et al., "Evaluation of silica gel-based brush type chiral cation exchangers with (S)-N-(3,5-dinitrobenzoyl) tyrosine as chiral selector: attempt to interpret the discouraging results", Journal of Chromatography, vol. 694, No. 1, Mar. 3, 1995, pp. 151-161.

* cited by examiner

ENANTIOSELECTIVE CATION-EXCHANGE MATERIALS

The present invention relates to enantioselective cation-exchange materials, comprising a chiral selector composed of a chiral component and at least one cation-exchange group, a spacer and a carrier.

In particular, the present invention relates to enantioselective molecular recognition materials of the cation-pairing type and the cation-exchange type, representing a new class of separation materials which carry new chiral selector components with a free functional acid group or with free functional acid groups, respectively, at their surface in order to specifically interact with complementary structured molecules. A further subject of said invention is their use in molecular recognition concepts for the highly selective binding and separation, isolation and purification of basic chiral compounds including chirons, drug substances, amino acids, peptides, proteins, aminoglycosides and other basic chiral compounds.

BACKGROUND OF THE INVENTION

Biological systems consist of inherent chiral components, f.i. proteins, which may interact with the stereoisomers of endogenous and exogenous chiral compounds in different manners. As a result, stereoisomers of exogenous compounds such as drug substances, toxins, agricultural chemicals or food additives very often possess different pharmacological and toxicological profiles. This effect, for instance, forced developers of drug substances to study the pharmacological profiles of individual enantiomers separately and also resulted in an increased number of drug substances which are produced and marketed as an individual enantiomer. A precondition for that is the availability of preparative methods for the production of enantiomers and of analytical tools for the stereoselective analysis of quality and pharmacokinetic effects.

Individual enantiomers can be produced by stereoselective synthesis or racemate resolution. The latter approach is often the preferred and more widely available process, since syntheses of racemates can usually be carried out easily and at relatively low costs in comparison with a stereoselective synthesis and the methodologies of racemate resolution are often applicable to different, structurally varied classes of compounds. The latter approach can also be preferable if both enantiomers are used in purely enantiomeric form such as for pharmacological tests. In any case, the latter approach requires chiral selectors or functional materials that are modified by selector groups which can stereoselectively interact with both enantiomers if contacted with the racemate.

The present invention now discloses novel chiral selectors of that kind and novel functional materials, which may be applied in different preparative racemate resolution or enantiomeric separation concepts including chromatographic solid-liquid or liquid-liquid methods, solid-liquid or liquid-liquid extraction technologies and membrane separation techniques. Similarly, the chiral selectors and functional materials can also be used in analytical enantiomer separation methods, wherein they are integrated as adsorption materials in a column liquid chromatography, supercritical fluid chromatography, capillary electrochromatography, in chip technologies or as molecular recognition materials and sensitive layers in sensor technologies.

The enantioselective cation-exchange material according to the invention comprises a chiral selector composed of a chiral component and at least one cation-exchange group, a spacer and a carrier and is characterized in that the chiral component has a molecular weight of less than 1,000 and the at least one cation-exchange group is an acid group having a pKa<4.0.

The enantioselective cation-exchange material is preferably characterized in that the acid group has a pKa<3.5. Furthermore, it is preferred that the acid group has a pKa<2.5.

In a further preferred embodiment, the enantioselective cation-exchange material according to the invention is characterized in that the acid group is a sulfonic, sulfinic, phosphoric, phosphonic or phosphinic group.

The present invention is based on the surprising finding that the capabilities of chiral recognition of enantioselective cation exchangers improve with an increasing acidity of the low-molecular weight synthetic chiral selector.

The primary target compounds of the presently invented enantioselective molecular recognition materials of the cation-pairing type and the cation-exchange type are basic chiral drug substances and intermediates (chirons). Since a high percentage of the total market share of chiral drug substances contains basic functional groups, rendering them amenable to separation by the invented functional molecular recognition materials, those substances should have a wide range of applicability.

Moreover, many biomolecules are also chiral, comprising basic functionalities, and thus the presently invented functionalized solid phases and materials, respectively, are also suitable for separations of basic biomolecules, in particular of closely related analoga and isomeric forms. Application areas of the novel materials therefore also include the separation of amino acids, peptides, proteins, nucleotides, aminoglycosides and a large number of other basic chiral compounds.

In the following, the most important features of the present invention are described briefly. The present invention relates to enantioselective molecular recognition materials of the cation-exchange type and the cation-pairing type, composed of at least 3 modules which are i) an acidic chiral selector composed of a chiral component or a structural unit comprising a functional acid group, ii) a spacer and iii) a carrier or a polymer backbone, according to the general pattern as illustrated in FIG. 1.

In any case, the invented functional materials possess at least 1 free functional acid group (in the following referred to as X-substituent). The X-substituent is a strongly acidic functional group having a $pK_a<4.0$ (based on an entirely aqueous system; regarding the conditions of $pK_a$-determination, see Example 7) such as a sulfonic, sulfinic, phosphoric, phosphonic, phosphinic, boronic, amidophosphonic, amidosulfonic acid or any other acid group. Seen from the point of view of molecular recognition, this functional acid group controls the interaction with the cationic target, the analyte or the sample components via strong intermolecular ionic interactions in accordance with ion-pairing and ion-exchange mechanisms, which are the stronger, the lower the dielectric constant of the medium, but which are also active in aqueous or aqueous-organic liquid phases.

It has been found that the selector-analyte binding strength increases as the $pK_a$ of the cation-exchange group decreases, i.e. as the acidity of the functional acid group of the selector increases. Surprisingly, also the capability of enantioselective binding and separation improved with a stronger bond. This was by far not expected: Although it may be assumed that a stronger cation exchanger would bind oppositely charged analytes more strongly than a weak counterpart, higher enantioselectivity could not be expected as the logical consequence. On the contrary, experience shows that analytes which are bound too strongly very often produce only a moderate enantioselectivity.

The chiral component carrying the acidic X-substituent is a chiral compound in a single enantiomeric form or is constructed from enantiomerically pure chirons. Together, the chiral component and the X-substituent form the low-molecular weight chiral acidic selector forming the core of the present functional materials, as they provide the information for a selective molecular recognition of the target compounds. In contrast to macromolecular formations such as proteins, the chiral component preferably has a low molecular weight and is typically synthesized from chirons such as natural or unnatural, cyclic or non-cyclic amino acids, hydroxycarboxylic acids, aminophosphonic acids, aminophosphinic acids, aminosulfonic acids, aminosulfinic acids, aminoboronic acids, hydroxyphosphonic acids, mercapto-phosphonic acids, hydroxyphosphinic acids, tartaric acid derivatives, mandelic acid derivatives, camphor sulfonic acid derivatives, linear or cyclic, natural and unnatural peptides, linear or cyclic sulfopeptides, linear or cyclic phosphonopeptides. The low-molecular weight chiral acidic selector may also be an amphoteric compound which is negatively charged if used under conditions below the isoelectric point. Apart from the primary ionic interaction site created by the X-substituent, optimally functioning variants of molecular recognition materials of the cation-exchange type and the cation-pairing type, in addition, also exhibit other interaction sites such as hydrogen-donor-acceptor groups (indicated by Y) and/or π—π interaction sites (aromatic groups with preferably electron-withdrawing or electron-releasing substituents) as well as bulky elements for repulsive and/or attractive interactions of the van der Waals type. The functional Y-substituent may be an amide, carbamate, sulfonamide, urea, carbonyl, semicarbazide, hydrazide or sulfonimide group or another similar hydrogen-donor-acceptor system. Bulky elements of the selector component and interacting functional groups are assembled such that a binding pocket is preformed, with the polar interaction sites being arranged closer to the centre of the pocket and the hydrophobic bulky groups being arranged at the edge of the pocket. Target analytes which sterically and electrostatically meet the binding conditions are able to bind selectively into said pocket, whereas others are excluded from strong binding.

For many applications, those selectors must be immobilized on solid or optionally also liquid matrices referred to as carriers in such a way that the selector groups are properly exposed to the surrounding solution containing the target compounds to be selectively recognized and bound, whereby their binding is rendered possible. The carrier should be inactive (inert) with respect to the binding of the target compound, while having the function of guaranteeing the chemical and physical stability of the molecular recognition material. In flow applications such as chromatography, the carrier or its physical properties, respectively, determine(s) the kinetic properties of the materials. It is therefore an important component of the functional material. In the present invention, the carrier can be an inorganic, organic or mixed inorganic-organic hybrid-like material. Such carrier materials comprise commercially available and self-developed beads, monolithic or continuous materials, nanoparticles, membranes, resins, surface-limited layers produced from chemical materials comprising silica ($SiO_2$), alumina ($Al_2O_3$), zirconia ($ZrO_2$), titania ($TiO_2$), materials derived from sol-gel, organic-inorganic silica-containing hybrid materials, optionally cross-linked polysiloxanes, any polymer obtained from vinyl monomers, optionally cross-linked poly(meth)acrylates, optionally cross-linked poly (meth)acrylamides, optionally cross-linked polystyrenes, mixed styrene-(meth)acrylate polymers, ring-opening methathesis polymers, polysaccharides, agarose and any of those materials specifically functionalized to permit immobilization of the low-molecular weight chiral acidic selector. Among preferred carriers, there are silica beads, poly(meth) acrylate polymer beads, poly(meth)acrylamide beads, poly (meth)acrylate monoliths, polystyrene resins which optionally are modified with adherent reactive groups in order to immobilize the selector.

A polymer backbone or a polymer matrix can also be regarded as a carrier so that a spacer and a chiral acidic selector represent actually adherent chiral groups of the polymer that are responsible for a selective molecular recognition of the basic target compounds.

The spacer has mainly the function of binding the low-molecular weight acidic selector to the carrier. Both the length and the chemical functionality of the spacer are variable. To a certain degree, it can participate in the selector-analyte binding, involving a positive, but also a negative effect on selectivity. It can influence the rigidity and accessibility of the selector, thereby also affecting the binding characteristics. Finally, it determines the chemical stability of the functional materials and can influence their compatibility with analytes, a factor which is essential in particular for the separation of biomolecules. All general solid-phase linker concepts and approaches for the preparation of chromatographic stationary phases can be used for the synthesis of the present functional materials. Immobilization strategies that are preferred for the synthesis of presently invented chiral cation-exchange materials comprise the reaction of a vinyl-modified acidic selector with a thiol-modified carrier, in particular with thiolpropyl-modified silica, via a radical addition reaction. Other immobilization concepts which may be applied comprise the asymmetrical reaction of a diisocyanate linker with an amino- or hydroxyalkyl-modified carrier and an amino- or hydroxy-modified selector component, the reaction of an amino-, hydroxy- or thiol-modified carrier with a chloro- or bromoalkanoyl-derivatized selector, the reaction of alkoxy- or chloroorganosilane with a terminal reactive functionality for coupling to a selector component, the hydrosilylation reaction of alkoxy- or chlorohydrosilane with a selector containing a vinyl group, the coupling of an amino-modified carrier and an amino-modified selector by reacting one of the 2 components with a dicarboxylic-acid anhydride spacer component and the subsequent activation of the resulting carboxylic acid function and reaction with a second amino component and many other immobilization strategies which in general are used for the immobilization of chiral selectors, proteins and peptides on solid carriers.

In special cases, the current enantioselective separation method of the cation-exchange type can be combined with other separation methods such as reversed-phase chromatography, for example, by using novel surface modifications obtained by combining the above-described selector components with long-chain alkyl groups, resulting in RP-chiral hybrid selectors of the cation-exchange type and solid phases with a dedicated selectivity and separation character.

One of the particular advantages is that the above-described functional materials are resistant to more or less all liquid-phase systems that are normally used. Hence, those functional materials can be operated with phenotypes of the aqueous, aqueous-organic (reversed phase), polar organic phase and apolar organic phase (normal phase), wherein the liquid or mobile phase must in any case contain a cation, preferably an ammonium or an organic ammonium compound, as a counterion, for operation in the ion-exchange mode.

The present invention also relates to the application of any method which uses the novel molecular recognition materials according to the invention of the cation-exchange type and the cation-pairing type in preparative chromatographic solid-liquid or liquid-liquid methods, solid-liquid or liquid-liquid extraction technologies and membrane separation techniques. In analogy, a further subject of the present patent application is their application in analytical methodologies, wherein they are integrated as adsorption materials in a column liquid chromatography, supercritical fluid chromatography, capillary electrochromatography, in chip technologies or as molecular recognition materials and sensitive layers in sensor technologies.

STATE OF THE ART

A variety of chirally functionalized adsorption materials were previously developed for the purpose of enantiomer separation. A detailed survey of enantioselective stationary phases and the respective methods, wherein such materials are used for an HPLC-enantiomer separation, is provided elsewhere [M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp. 337–437]. Some of the functionalized chiral materials associated with the present invention via some aspect or other are described in the following chapter.

Low-Molecular Weight Chiral Ion Exchangers:

Previously, the inventors of the present invention disclosed the discovery of chiral separation materials of the anion-exchange type which had low-molecular weight synthetic basic chiral selectors immobilized on solid carriers and were used for the separation of stereoisomers from acid compounds (Cinchonan Based Chiral Selectors for Separation of Stereoisomers. Lindner, W., Lämmerhofer, M., Maier, N. M., *PCT Int. Appl.* (1997) WO 9746557, EP 912563, U.S. Pat. No. 6,313,247). Detailed descriptions of said work were later published in various essays [M. Lämmerhofer et al., *J. Chromatogr. A*, 741 (1996) 33; A. Mandl et al., *J. Chromatogr. A*, 858 (1999) 1; N. M. Maier et al., *Chirality*, 11 (1999) 522], cf. also chapter 9.2.3.2. by [M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp. 337–437] and references contained therein. The same selectors and chiral stationary phases were also used in capillary electrochromatography (CEC) [M. Lämmerhofer and W. Lindner, *J. Chromatogr. A*, 829 (1998) 115–125] or were specifically adapted for use in the CEC [M. Lämmerhofer et al., *Anal. Chem.*, 72 (2000) 4614–4628; J. M. J. Frechet, F. Svec, M. Lämmerhofer, Electrochromatographic device for use in enantioselective separation and enantioselective separation medium for use therein. U.S. patent application Ser. No. 09/645,079 (2000).]. Related chiral stationary phases based on ergot alkaloid selectors were developed by M. Flieger, M. Sinibaldi and collegues, cf. references 392–395 by [M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp. 337–437]. All those alkaloid-derived chiral materials are conceptually associated with the present invention via the existence of enantioselective chiral ion-exchange mechanisms involving ionic interactions between oppositely charged chiral selectors and analytes. This, however, represents an approach that is reciprocal to what is claimed in the present patent application, which means that an individual enantiomer of a cationic chiral compound is used as a chiral selector and is immobilized on solid carriers or incorporated in polymeric backbone materials, resulting in chiral anion exchangers. Naturally, the spectrum of applicability of such enantioselective anion exchangers is more or less limited to the separation of chiral acids. In theory, enantioselective stationary phases, which would permit the separation of enantiomers from chiral bases, could be developed by applying the principle of reciprocity of chiral recognition [W. Pirkle et al., *J. Chromatogr.*, 192 (1980) 143–158; W. Pirkle and R. Däppen, *J. Chromatogr.*, 404 (1987) 107–115], wherein a single enantiomer of the acidic binding partner of the above-described chiral anion-exchange concepts is immobilized. In practice, however, said principle as described below can easily fail and its experimental realization is not trivial. At this point, it must be emphasized that the principle of reciprocity of chiral recognition was originally discovered for stationary phases of the Pirkle concept (vide supra), which also uses neutral selectors and analytes, and therefore it was unclear whether said principle also applies to the chiral ion-exchange concept with charged selectors and analyte species.

Encouraged by the success of the approach of chiral anion exchange, the inventors had already earlier actually attempted to reciprocally extend said concept to basic analytes, which resulted in low-molecular weight chiral cation exchangers, unfortunately with very negative results [E. Veigl et al., *J. Chromatogr. A*, 694 (1995) 151]. In contrast to the successful examples which were reported in connection with the Pirkle concept, the principle of reciprocity of chiral recognition very surprisingly did not work in case of enantioselective ion exchangers. Similar problems with the realization of the principle of reciprocity were already earlier addressed in several publications also dealing with chiral stationary phases of the Pirkle concept [M. H. Hyun et al., *J. Chromatogr. A*, 922 (2001) 119–125].

The work by Veigl et al. was the only attempt at enantioselective cation exchangers reported so far, the developed materials were completely useless, however. Those entirely negative results were described and interpreted in an essay published in J. Chromatogr. [E. Veigl et al., *J. Chromatogr. A*, 694 (1995) 151] and lead to the technical prejudice among scientists working in the field of chiral separation that such enantioselective cation exchangers could for no reason whatsoever function successfully. This is also reflected by the long time which passed until the inventors could surprisingly overcome said technical prejudice. The key to the success of the present invention was the discovery that the capabilities of chiral recognition of enantioselective cation exchangers improve with an increasing acidity of the low-molecular weight synthetic chiral selector. In the past, this inventive step was not surpassed, and the suitable strongly acidic functional structural element was never combined with other suitable structural elements (a short distance between the stereogenic centre and the primary ionic interaction site which is in an $\alpha$, $\beta$ or $\gamma$ position relative to the stereogenic centre, steric barriers, aromatic groups for π—π interaction) which are necessary for successful chiral selectors. The novel enantioselective cation exchangers combining all above-mentioned favourable structural features yielded very promising results in terms of enantioselective molecular recognition and enantiomer separation of chiral bases of different kinds. Preferably, the strong enantioselective cation exchangers based on selectors carrying sulfonic or phosphonic acid groups are clearly distinguishable from the unsuccessful precedents of the above-mentioned essay by their great capabilities of enantiorecognition (see examples).

Chiral Ion-Pair Chromatography:

From a generic point of view, the chiral ion-pair chromatography can be regarded as somehow associated with the methods of enantioselective ion-exchange chromatography [discussed by C. Pettersson and E. Heldin in: A practical approach to chiral separations by liquid chromatography. G. Subramanian (ed.), V C H, Weinheim, 1994, pp. 279–310]. For the purpose of separating chiral bases, acidic chiral counterions such as 2,3,4,6-Di-O-isopropylidene-2-keto-L-gulonic acid, Z-derivatized amino acids, di- or tripeptides, 10-camphor sulfonic acid, tartaric acid and tartaric acid derivatives were, for example, used as additives to the mobile phase [see C. Pettersson and E. Heldin in: A practical approach to chiral separations by liquid chromatography. G. Subramanian (ed.), V C H, Weinheim, 1994, pp.279–310, and references contained therein]. Those chiral counterions stereoselectively form electrically neutral ion pairs with chiral bases in the mobile phase, exhibiting different adsorption properties on achiral stationary phases such as stationary phases of the reversed-phase type. As a secondary balance, also the chiral counterion can be adsorbed onto the stationary phase, thus forming a dynamically coated chiral ion exchanger. The disadvantage of such an approach lies in the presence of the selector in the effluent medium, which causes disturbances and problems in most detection methods and prevents them from being used in preparative concepts. The covalent adherence of the selector on the stationary phase in the materials according to the invention and the resulting elimination of the selector from the effluent medium does indeed represent a substantial advantage over the mode of ion-pair chromatography.

Chiral Ligand-Replacement Separation Materials:

It might be assumed that stationary phases of the chiral ligand-replacement type [discussed by V. A. Davankov, J. Chromatogr. A, 666 (1994) 55; and by A. Kurganov, J. Chromatogr. A, 906 (2001) 51–71; and by M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp. 337–437], using stereoselective chelate formation as the principle of separation, are somehow also associated with the above-described low-molecular weight chiral ion exchanger. Most frequently, amino acids, in particular proline derivatives, are dynamically or covalently immobilized on suitable carriers as chelating agents or as chiral selectors, respectively, which carriers selectively form mixed metal complexes with analytes which must exhibit chelation properties also for the metal ions that are dissolved in the liquid (mobile) phase. In comparison with the materials of the present invention, there are, in general, at least 2 clear distinctions: i) Instead of a selector of the ion-exchange type, a chelator is immobilized on the carrier. Such chelators are often amino acids such as proline, hydroxyproline or penicillin derivatives such as mentioned above [regarding the structures, see above-indicated review articles and references contained therein]. Functional materials of the chiral ligand-replacement (CLEC) type usually possess acidic as well as basic functional groups. ii) Totally different molecular recognition and SO-SA binding mechanisms are involved. As opposed to separation materials according to the invention of the cation-exchange type, there is no formation of ion-ion interactions between acidic selector components and cationic groups of the analyte. For instance, enantiomers of amino alcohols can be resolved with phases of the CLEC type, wherein the functional acid group of the phase of the CLEC type interacts with the positively charged metal ion which also acts as an electron acceptor for the basic function of the analyte in the mixed selector-metal-analyte complex.

Chiral Crown Ether Phases

Recently, Machida et al. developed a novel chiral stationary crown ether phase [Y. Machida et al., J. Chromatogr. A, 805 (1998) 85–92; M. H. Hyun et al., J. Chromatogr. A, 822 (1998) 155–161] for the separation of enantiomers from chiral primary amines. The crown ether component of that CSP comprises carboxylic acid groups. However, by being included in the cavity of the macrocyclic crown, the primary amines are complexed and kept inside, in particular due to the simultaneous triple hydrogen bond between the NH of the ammonium ion and the ether oxygens, such as shown in NMR trials [Y. Machida et al., J. Chromatogr. A, 810 (1998) 33–41: p.39]. Steffeck, Zelechonok and Gahm in J. Chromatogr. A 947 (2002) 301–305, describe an enantioselective separation of racemic secondary amines on that chiral stationary liquid-chromatography phase based on a crown ether.

Chiral Stationary Phases, Based on Macromolecular and Medium-Sized Natural Selectors:

Stationary phases of the protein type, f.i. based on bovine serum albumin (BSA) [S. Allenmark et al., J. Chromatogr., 264 (1983) 63], human serum albumin (HSA) [E. Domenici et al., Chromatographia, 29 (1990) 170], $\alpha_1$-acidic glycoprotein (AGP) [J. Hermansson, J. Chromatogr. 269 (1983) 71], or ovomucoid (OVM) [T. Miwa et al., J. Chromatogr., 408 (1987) 316], can be regarded as counterparts to the presently invented low molecular selectors of the ion-exchange type on a macromolecular selector level [regarding a more detailed list of proteins used for enantiomer separation, see discussions by J. Haginaka, J. Chromatogr. A, 906 (2001) 253–273; and by M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp.337–437; chapter 9.2.1.2. pp. 365–373]. Ionized functional groups of the side chains of the protein may be subjected to an ion-ion interaction with complementary charged functional groups of the analytes. As emphasized, they are distinguished from the materials of the present invention by the molecular size of the selector and the resulting unfavourable ratio between selective binding sites with high affinity per mole protein and the chiral stationary phase, which results in an adverse load capacity for the latter. In addition, protein selectors are entirely natural selectors from a biological source, formed exclusively from natural proteinogenic amino acids, and those differentiating binding sites cannot be tailored chemically in order to be better aligned with the steric and functional preconditions of analytes. Dedicated derivatization and optimization strategies are unfeasible. They furthermore have limited chemical and biological stabilities, disadvantages which do not exist in the materials according to the invention or are overcome by the use of unnatural amino acids as structural units.

A further but different macromolecular natural chiral selector which was used for the production of chiral separation materials is heparin, a glucosaminoglycan, which is a heterogeneous mixture of variably sulfated polysaccharide chains consisting of recurrent units of D-glucosamine and either L-iduronic or D-glucuronic acid. Chloroquine enantiomers were separated by high-pressure liquid chromatography, using a chiral stationary phase based on heparin [A. Stalcup et al., Anal. Chem., 68 (1996) 13]. The CSP based on heparin is not very well characterized as it is randomly composed of varying repetition units (vide infra) and also lacks essential structural elements of the presently invented selectors such as steric barriers and π—π interaction sites.

A further group of selectors from a natural source are macrocyclic antibiotics including vancomycin, teicoplanin, ristocetin and avoparcin [discussed by M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp. 337–437; chapter 9.2.2.2., pp. 381–392; and by T. J. Ward and A. B. Farris III, J. Chromatogr. A, 906 (2001) 73–89]. From those medium-sized macrocyclic selectors which likewise have capabilities of ionic interaction, chiral stationary phases were also developed, f.i. from vancomycin [D. W. Armstrong et al., Anal. Chem., 66 (1994) 1473], teicoplanin [D. W. Armstrong et al., Chirality, 7 (1995) 474] and ristocetin [K. H. Ekborg-Ott et al., Chirality, 10 (1998) 434]. It has been shown that, as primary functional mechanisms, inclusion-complex formations into the basket formed by the macrocyclic structure dominate in combination with a multiple hydrogen bond at the peptide chain of the peptidomimetic, whereas interactions of the ion-exchange type—should they exist—are of secondary importance. In contrast to the low-molecular weight synthetic selectors according to the invention of the ion-exchange type, those natural selectors are not synthetically assembled due to their complicated structure and hence are not available in both enantiomeric forms.

Macromolecular Synthetic Chiral Ion Exchangers, Obtained by a Molecular Imprinting Process:

Some chiral separation media can be counted among said ion-exchange class, which separation media are entirely synthetic and are obtained by matrix polymerization of ionizable functional monomers and complementary ionizable matrix molecules, so-called molecularly imprinted polymers (MIP). If the matrix molecule is an individual enantiomer of a chiral compound, chiral cavities can be formed which are able to again selectively bind the matrix. Before that, the existence and predominance of a cation-exchange retention mechanism for an acidic MIP was established by Sellergren and Shea, which was produced from methacrylic acid as a functional monomer and basic phenylalanine anilide as a matrix [B. Sellergren and K. J. Shea, J. Chromatogr. A, 654 (1993) 17]. The most significant difference of those materials in comparison with those of the present invention consists in the (micro)heterogeneity of the binding sites. As emphasized, the enantioselective binding sites of MIP type cation exchangers are assembled from non-chiral functional monomers, resulting in ill-defined and heterogeneous binding sites, unlike enantioselective cation-exchange materials according to the invention where the binding site is completely specified and characterized. This has a negative impact on the capacity of the separation material, which is a problem inherent to MIPs. More details can be found in a recently published review article [B. Sellergren, J. Chromatogr. A, 906 (2001) 227–252].

Chiral Separation Materials of the Non-Ion-Exchange Type with a Certain Relation to the Present Invention:

A large number of chiral stationary phases based on low-molecular weight synthetic selectors use the same or similar chiral structural units (chirons) as disclosed in the present application. However, one significant difference consists in that the acidic function is esterified or amidated, resulting in separation materials with neutral chiral selectors. Such CSPs are used for the separation of enantiomers from neutral chiral compounds or from basic and acidic chiral compounds under conditions at which ionization is suppressed. This concept is known as the Pirkle concept; detailed lists of selectors and chiral stationary phases which were developed and may be classified as Pirkle-concept phases can be found in discussions by [M. Lämmerhofer and W. Lindner, Recent developments of liquid chromatographic enantioseparation. In: Handbook of analytical separations. (Series ed.: R. M. Smith). Volume 1: Separation methods in drug synthesis and purification (ed.: K. Valko) Elsevier, Amsterdam, 2000, pp.337–437, chapter 9.2.3.1.; pp. 395–405; by F. Gasparrini et al., J. Chromatogr. A, 906 (2001) 35–40; and by C. Welch, J. Chromatogr. A, 666 (1994) 3]. Some of the most prominent representatives are phases based on N-(3,5-dinitrobenzoyl)phenylglycine (DN-BPG) or N-(3,5-dinitrobenzoyl)leucine (DNBLeu) [W. H. Pirkle et al., J. Chromatogr., 348 (1985) 89; and W. H. Pirkle and J. E. McCune, J. Chromatogr., 479 (1989) 419], N-DNB-3-amino-3-phenyl-2-tert.-butyl-propanoic acid (β-Gem 1) [W. H. Pirkle and J. E. McCune, J. Chromatogr., 441 (1988) 311], N-(2-naphthyl)alanine (NAP-A1) [W. H. Pirkle et al., J. Org. Chem., 51 (1986) 4991], N-(3,5-dinitrobenzoyl)tyrosine (DNB Tyr-E and ChyRoSine) [N. Bargmann-Leyder et al., Chromatographia, 39 (1994) 673 and N. Bargmann-Leyder et al., Anal. Chem., 67 (1995) 952], N-{[1-(1-naphthyl)ethyl]amido}-tert.-leucine (Sumichiral OA-4600) [N. Oi et al., J. Chromatogr. A, 694 (1995) 129], N-DNB-α-amino-2,2-dimethyl-4-pentylphosphonic acid (α-Burke 1) [W. H. Pirkle and J. A. Burke, J. Chromatogr., 557 (1991), 173] and L-Val-L-Val-L-Val-tripeptide [N. Oi et al., J. Chromatogr. A, 722 (1996) 229]. There were reports on other CSPs based on peptides, f.i. on a CSP from Val-tripeptide and 1-(1-naphthyl)amine as chirons accumulated around triazine [A. Iuliano et al., J. Chromatogr. A, 786 (1997) 355], or on CSPs for N-(2-naphthyl)alanine diethylamide based on dipeptide selectors which were N-terminally derivatized with DNB and were developed by a combinatorial approach [C. J. Welch et al., Enantiomer, 3 (1998) 471]. Again, it must the emphasized that, in all those approaches, ion-exchange mechanisms were not predominant, whereby they are clearly distinguishable from the present invention.

Other Non-Related Approaches and Materials:

Conventional separation materials of the cation-exchange type have achiral functional acid components immobilized on carriers and therefore are not associated with the functional materials of the present invention. They may be used for the separation of chiral bases, however, they are not enantioselective, i.e. they are unable to separate enantiomers from chiral bases. Similarly, the peptide-like poly(aspartic acid)-silicon dioxide sorption agent (PolyCAT A) produced from optically inactive poly(succinimide) [C. N. Ou et al., J. Chromatogr., 266 (1983) 197] was developed for the non-enantioselective cation-exchange chromatography of proteins. Moreover, said poly(aspartic acid) material was modified with achiral taurine such that a sulfoethyl aspartamide-modified stationary phase (polysulfoethyl A) was obtained. It was also used for non-enantioselective cation-exchange chromatography. The functional groups of those sorption agents represent indefinite, randomly polymerized, optically inactive ligand molecules and are therefore clearly distinguishable from the low-molecular weight chiral acid selectors according to the invention, whereby a properly characterized structure and additional structural features (f.i. π—π interaction site) are necessary in order to be enantioselective. Actually, the above-mentioned polyCAT A and polysulfoethyl A phases are not enantioselective for chiral bases.

Other stationary phases modified with peptides are used in non-enantioselective affinity chromatography concepts. Examples of such materials comprise monoliths which are modified with synthetic peptides and used for immunoaffinity chromatography [G. A. Platonova, et al., J. Chromatogr. A, 1999, 852, 129–140], namely with a Ser-Pro-Gly-Phe-Arg sequence synthesized directly on monolithic discs and granular materials which then—after cleaving off the N-terminal protective group—were used directly for immunoaffinity chromatography [V. L. Korol'kov et al., Lett. Pept. Sci., 2000, 7, 53–61], as well as monoliths produced in situ and comprising a peptide ligand for immunoaffinity chromatography [R. Hahn et al., Anal. Chem., 73 (2001) 5126–5132].

DESCRIPTION OF PREFERRED EMBODIMENTS

The present invention provides enantioselective molecular recognition materials of the cation-exchange type and enantioselective molecular recognition materials of the cation-pairing type, which are inorganic, organic or chiral chemical compounds or materials based on an inorganic/organic hybrid, which are constructed from low-molecular weight chirons and at least one free functional acid group having $pK_a<4.0$ (based on purely aqueous conditions) as low-molecular weight synthetic chiral acidic selectors.

The chiral acidic selectors preferably exhibit the following additional structural features, preferably in combination:
close proximity of the functional acid group to the closest stereogenic centre, which means that the acidic function is in an α, β or γ position relative to the stereogenic centre,
steric barriers which are bulky aliphatic, alicyclic or aromatic groups,
aromatic groups with π-acidic or π-basic properties as π—π interaction sites.

The functionalized materials according to the invention are preferably constructed from a low-molecular weight chiral acidic selector and a polymer matrix which are interconnected by a spacer or tether, wherein the functional acid group of the low-molecular weight chiral acidic selector can be selected from the group comprising a sulfonic acid, a phosphonic acid, a phosphinic acid, a phosphoric acid, a boric acid, a phosphonic acid monoamide, a phosphoric acid monoamide, an amidosulfonic acid and others.

The low-molecular weight chiral acidic selector is preferably immobilized on a solid carrier selected from the group consisting of silica ($SiO_2$), alumina ($Al_2O_3$), zirconia ($ZrO_2$), titania ($TiO_2$), matrices produced by sol-gel technology, organic-inorganic silica-containing hybrid materials, optionally cross-linked polysiloxanes, each polymer obtained from vinyl monomers, optionally cross-linked poly(meth)acrylates, optionally cross-linked poly(meth)acrylamides, optionally cross-linked polystyrenes, mixed styrene-(meth)acrylate polymers, ring-opening methathesis polymers, polysaccharides, agarose and which has one of the shapes as contained in the group comprising beads, monolithic or continuous materials, nanoparticles, membranes, resins and surface-limited layers.

The chiral acid selector can be incorporated in an inorganic, organic or inorganic/organic hybrid-like polymer obtained from a low-molecular weight chiral functional acid monomer, wherein the functional monomer is, f.i., a vinyl compound or an alkoxysilane and the polymer has one of the shapes as contained in the group comprising beads, monolithic or continuous materials, nanoparticles, membranes, resins and surface-limited layers.

The spacer, linker or tether has any length and functionality or may exhibit the general structure —$(CH_2)_{ni}$—Y—$(CH_2)_{nj}$—, wherein Y is missing or is any of the below-indicated functional groups (a)–(k) and $n_i$, $n_j$ are numbers between 1 and 18.

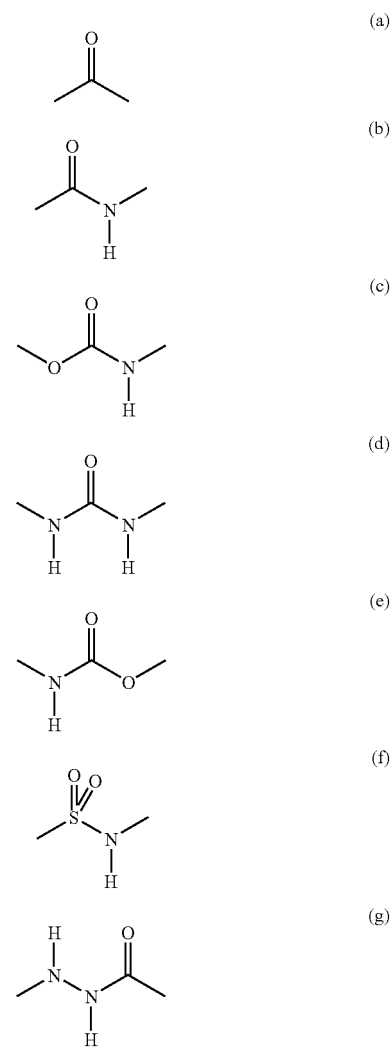

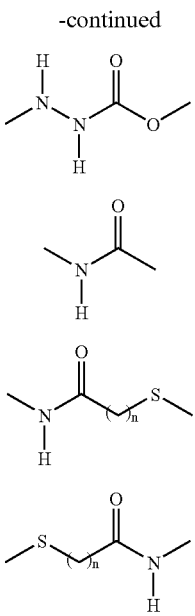

(h)

(i)

(j)

(k)

The low-molecular weight chiral acid selector can be selected from the group consisting of natural and unnatural amino acids, hydroxycarboxylic acids, aminophosphonic acids, aminophosphinic acids, aminosulfonic acids, hydroxysulfonic acids, amidosulfonic acids, aminoboric acids, hydroxyphosphonic acids, mercapto-phosphonic acids, hydroxyphosphinic acids, amidophosphonic acids, phosphonic acid monoamides, phosphoric acid monoamides, tartaric acid derivatives, mandelic acid derivatives, camphor sulfonic acid derivatives, linear or cyclic, natural and unnatural peptides, linear or cyclic sulfopeptides, linear or cyclic phosphonopeptides or a compound constructed from at least one of the components of said group.

The chiron from which the low-molecular weight chiral acidic selector is synthesized is taken from the group of above-specified chiral compounds and fits any of the below-indicated general structures (1)–(15), wherein X can be selected from the group consisting of phosphonic acid, sulfonic acid, phosphinic acid, boronic acid, phosphoric acid, amidophosphonic acid, amidosulfonic acid, amidophosphinic acid, wherein Y denotes one of the above-indicated groups (a)–(k) and R, $R_1$ . . . $R_i$ is one of the substituents from the group consisting of hydrogen, optionally substituted aliphatic, aromatic, araliphatic, heteroaromatic and alicyclic substituents and the low-molecular weight chiral acidic selector is oligomerized, polymerized, immobilized, grafted, assembled via any of the substituents R, $R_1$ . . . $R_i$ incorporating a spacer as illustrated above.

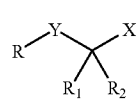

(1)

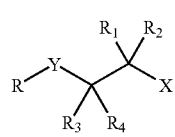

(2)

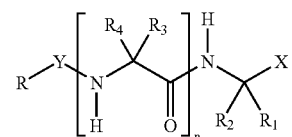

(3)

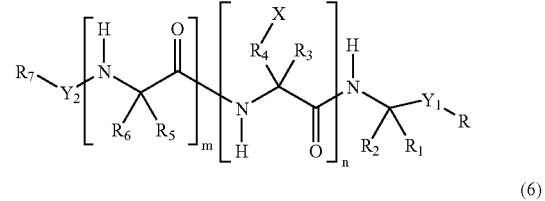

(4)

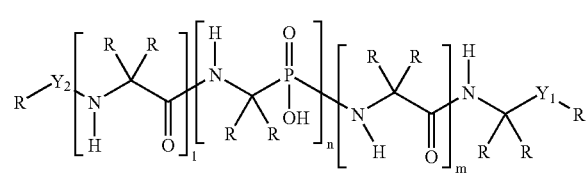

(5)

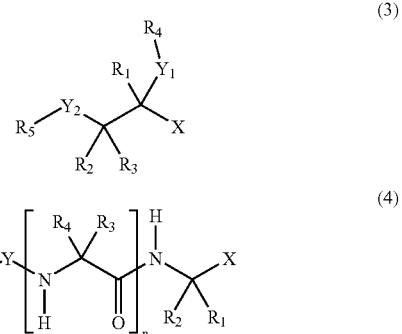

(6)

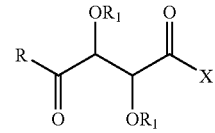

(7)

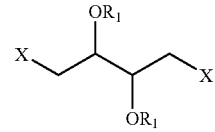

(8)

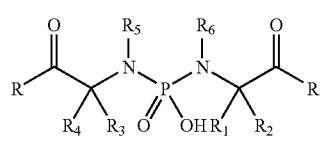

(9)

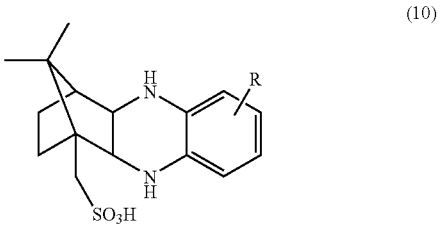

(10)

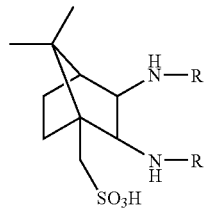

(11)

(12) 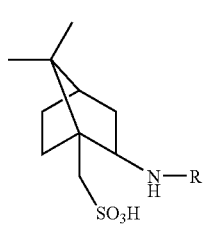

(13) 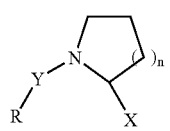

(14) 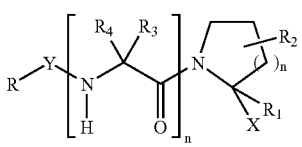

(15) 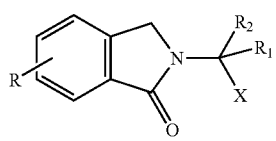

The low-molecular weight chiral acidic selector is preferably immobilized on thiol, amino, hydroxy, carboxy, epoxy, vinyl-modified silica, polymethacrylate polymer beads and resins, polyacrylamide polymer beads and resins, tentacle-like silica or organic polymer beads and resins.

The spacer binding the low-molecular weight chiral acidic selector to the optionally modified or activated carrier can be achieved by a radical addition reaction of a thiolalkyl-modified carrier to a vinyl group attached to the selector component or can be achieved by an asymmetrical reaction of a diisocyanate with an amino- or hydroxyalkyl-modified carrier and an amino- or hydroxy-modified selector component or by the reaction of an amino-, hydroxy- or thiol-modified carrier with a chloro- or bromoalkanoyl-detivatized selector, or by coupling an amino-modified carrier and an amino-modified selector by the reaction of one of the 2 components with a dicarboxylic acid anhydride spacer component and the subsequent activation of the resulting carboxylic acid function and the reaction with the second amino component or alkoxysilane having a terminal functionality for coupling to a selector component and subsequent binding of the resulting alkoxysilane-modified selector to silica gel or by any other approach suitable for selector immobilization.

The above-mentioned X, Y and R groups or substituents can have the meaning as illustrated below:

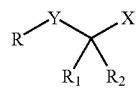
(1)

| X | Y | $R_1$ | $R_2$ | R |
|---|---|---|---|---|
| —COOH | (b) | H | Silicon dioxide propyl-4-(3-thiopropoxy)benzyl | 3,5-dichlorophenyl |
| —COOH | (b) | H | tert-Butyl | |

X, Y and R groups or substituents can also have the meaning as illustrated below:

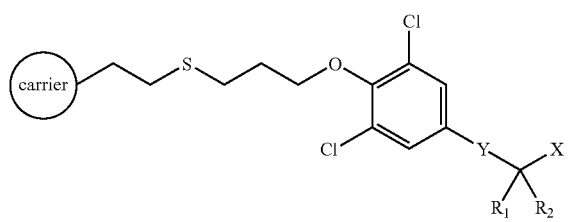

or

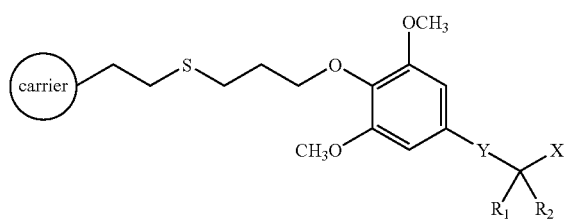

or

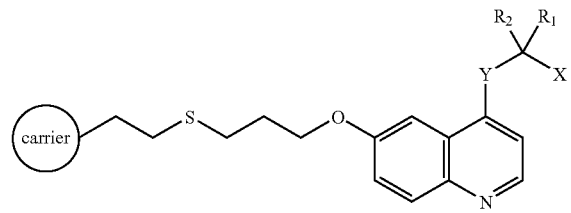

| X | Y | R₁ | R₂ |
|---|---|---|---|
| —COOH | (b) | H | isobutyl or neopentyl or 1-adamantylmethyl or naphthyl |
| —PO(OH)₂ | (b) | H | tert-butyl or isobutyl or neopentyl or 1-adamantylmethyl or naphthyl |
| —SO₃H | (b) | CH₃ | tert-butyl or isobutyl or neopentyl or 1-adamantylmethyl or naphthyl |
| —COOH | (d) | H | tert-butyl or isobutyl or neopentyl or 1-adamantylmethyl or naphthyl |
| —PO(OH)₂ | (d) | H | tert-butyl or isobutyl or neopentyl or 1-adamantylmethyl or naphthyl |
| —COOH | (e) | H | methyl or tert-butyl or isobutyl or neopentyl or 1-adamantylmethyl or naphthyl or phenyl |
| —PO(OH)₂ | (e) | H | methyl or tert-butyl or isobutyl or neopentyl or 1-adamantylmethyl or naphthyl or phenyl |
| —SO₃H | (e) | H | methyl or tert-butyl or isobutyl or neopentyl or 1-adamantylmethyl or naphthyl or phenyl or pyridyl |
| —COOH | (f) | H | tert-butyl or isobutyl or neopentyl or 1-adamantylmethyl or naphthyl |
| —PO(OH)₂ | (f) | H | tert-butyl or isobutyl or neopentyl or 1-adamantylmethyl or naphthyl |
| —COOH | (b) | H | 4-(HO)₂B-benzyl |

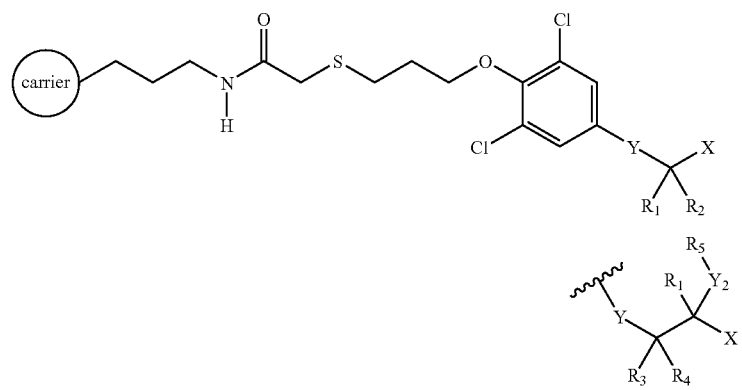

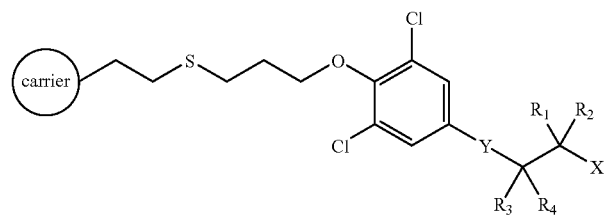

| X | Y | R₁ | R₂ | R₃ | R₄ |
|---|---|---|---|---|---|
| —COOH | (b) | H | H | H | tert-butyl |
| —PO(OH)₂ | (b) | H | H | H | tert-butyl |
| —SO₃H | (b) | H | H | H | tert-butyl |
| —SO₃H | (b) | H | H | H | —COOH or aryl-NHCO— or alkyl-NHCO— or tert-butyl-NHCO— |
| —SO₃H | (b) | CH₃ | CH₃ | H | —COOH or aryl-NHCO— or alkyl-NHCO— or tert-butyl-NHCO— |
| —PO(OH)₂ | (e) | H | —NHCOR | H | phenyl or methyl |
| —PO(OH)₂ | (b) | H | —OH or OR | H | methyl |
| —PO(OH)₂ | (b) | H | —OCONHR | H | methyl |
| —OPO(OH)₂ | (b) | H | H | H | —COOH or —CONHR |
| —B(OH)₂ | (b) | H | H | H | tert-butyl |

-continued

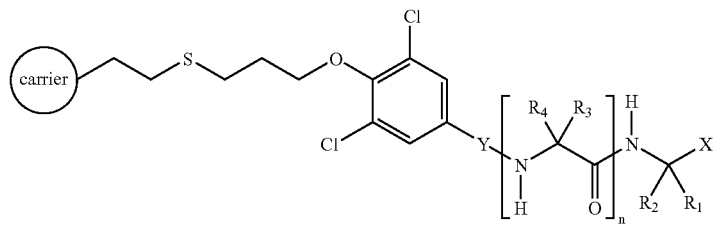

| X | Y | R₁ | R₂ | R₃ | R₄ | n |
|---|---|----|----|----|----|---|
| —COOH | (a) | H | tert-butyl or isobutyl or phenyl | H | tert-butyl or isobutyl or phenyl | 1 |
| —PO(OH)₂ | (a) | H | tert-butyl or isobutyl or phenyl | H | tert-butyl or isobutyl or phenyl | 1 |
| —CH₂—SO₃H | (a) | H | tert-butyl | H | tert-butyl or isobutyl or phenyl | 1 |
| —COOH | (i) | H | tert-butyl or isobutyl or phenyl | H | tert-butyl or isobutyl or phenyl | 1 |
| —PO(OH)₂ | (i) | H | tert-butyl or isobutyl or phenyl | H | tert-butyl or isobutyl or phenyl | 1 |
| —CH₂—SO₃H | (i) | H | tert-butyl | H | tert-butyl or isobutyl or phenyl | 1 |
| —COOH | (a) | H | tert-butyl or isobutyl or phenyl | H | tert-butyl or isobutyl or phenyl | 2 |
| —PO(OH)₂ | (a) | H | tert-butyl or isobutyl or phenyl | H | tert-butyl or isobutyl or phenyl | 2 |
| —CH₂—SO₃H | (a) | H | tert-butyl | H | tert-butyl or isobutyl or phenyl | 2 |

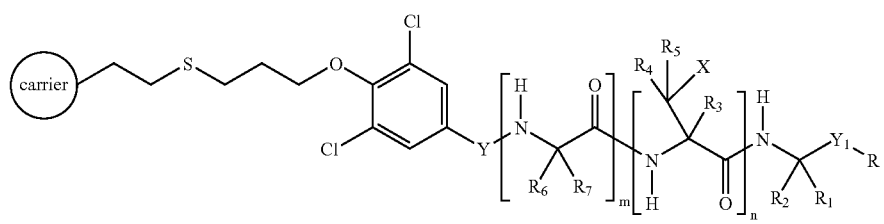

| X | Y | Y₁ | R₁ | R₂ | R₃ | R₄ | R₅ | n | R₆ | R₇ | m | R |
|---|---|----|----|----|----|----|----|---|----|----|---|---|
| —SO₃H | (a) | —CONH— | H | isobutyl | H | H or CH₃ | H or CH₃ | 1 | H | isobutyl | 1 | tert-butyl or aryl |
| —PO₄H₂ | (a) | —CONH— | H | isobutyl | H | H | H | 1 | H | isobutyl | 1 | tert-butyl or aryl |

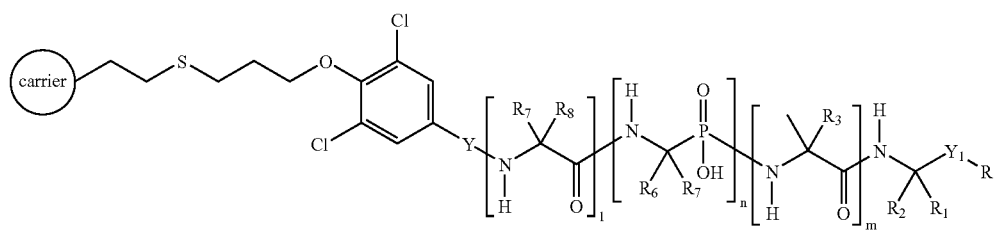

| Y | Y₁ | R₁ | R₂ | R₃ | R₄ | R₅ | n | R₆ | R₇ | R₈ | m | l | R |
|---|----|----|----|----|----|----|---|----|----|----|---|---|---|
| C=O | CONH— | H | iBu | H | phenyl | H | 1 | iBu | H | phenyl | 1 | 1 | tBu |
| C=O | CONH— | H | iBu | H | iBu | H | 1 | pheny | H | iBu | 1 | 1 | tBu |

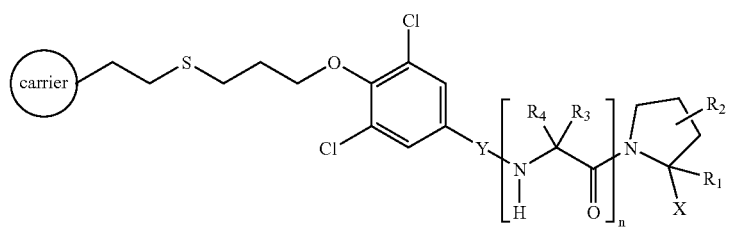

| X | Y | R₁ | R₂ | R₃ | R₄ |
|---|---|----|----|----|----|
| —PO(OH)₂ | (a) | H | — | H | isobutyl |
| —CH₂—SO₃H | (a) | H | — | H | isobutyl |

Furthermore, the present invention relates to the use of one of the functionalized materials as described herein for the molecular recognition, binding and separation of chiral compounds, wherein the chiral compound is selected from the group comprising basic drug compositions, basic synthons or intermediates, amino acids, peptides, proteins, nucleotides, aminoglycosides and other basic biomolecules, as well as to methods wherein the compounds are contacted with at least one of the functionalized materials as described herein in order to form reversible molecular binding products and separate mixtures of those compounds, wherein the steps of contacting and separating are carried out by means of a. liquid-phase separation techniques including liquid chromatography, capillary electrophoresis, capillary electrochromatography or supercritical fluid chromatography, or b. an extraction methodology including liquid-liquid extraction, countercurrent liquid chromatography, centrifugal distribution chromatography, liquid-solid extraction technology, supported liquid membrane or fixed-site membrane technology.

EXAMPLES

Figure 1:
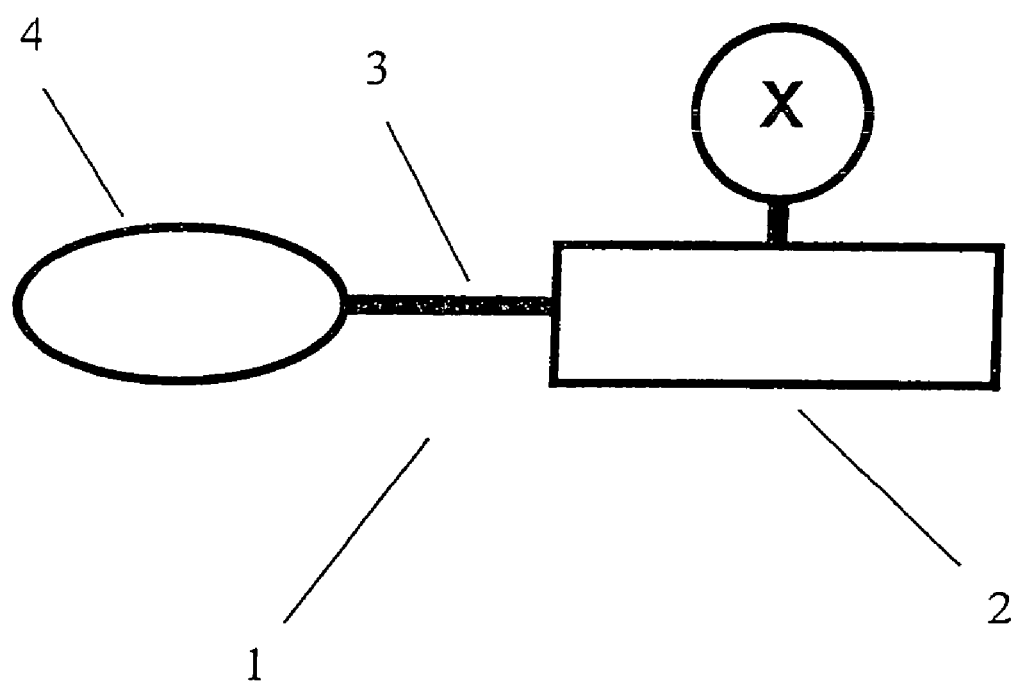
FIG. 1 schematically shows the structure of the chiral selector according to the invention, with 1 denoting the chiral selector, 2 denoting a chiral component, X denoting a cation-exchange group, 3 denoting a spacer and 4 denoting a carrier.

The present invention will now be described with reference to the following non-limiting examples.

Example 1

Synthesis of a Weak Chiral Cation Exchanger Based on (S)—O-allyl-N-(3,5-dichlorobenzoyl)-tyrosine, N-DCB-O-allyl-Tyr (a) Synthesis of a Selector of the Cation-Exchange Type N-Boc-(S)-tyrosine (3 mmol) (Propeptide, Vert Le Petit, France) was dissolved in 2 ml of dichloromethane and 2 ml of trifluoroacetic acid (Aldrich), and the reaction mixture was stirred for 3 hours at room temperature. Upon removal of the solvents under reduced pressure, (S)—O-allyl-tyrosine was obtained as a crude product which was used in the subsequent step without further purification.

According to standard reaction protocols, 3,5-dichlorobenzoic acid N-hydroxysuccinimide ester was produced from equimolar amounts of N-hydroxysuccinimide (Aldrich) and 3,5-dichlorobenzoic acid (98%) (Acros Organics, Geel, Belgium) in ethyl acetate in the presence of an equimolar amount of dicyclohexyl carbodiumide (Aldrich).

3 mmol (S)—O-allyl-tyrosine and 15 mmol sodium bicarbonate were dissolved in 100 ml of water. 3 mmol 3,5-dichlorobenzoic-acid N-hydroxysuccinimide ester were suspended in said solution under vigorous stirring. After 15 hours, the unreacted reagent was removed by filtration and the filtrate was acidified by the dropwise addition of 1M HCl. The precipitate thus formed was isolated by filtration and washed with water. The crude product was purified further by flash chromatography with silica (chloroform-methanol as eluent with increasing volumetric contents of methanol) (total yield of 85%).

$^1$H NMR (CDCl$_3$) δ 3.25 (q, 2H) 4.5 (d, 2H) 5.02 (q, 1H) 5.3 (d, 1H) 5.4 (d, 1H) 6.05 (m, 1H) 6.45 (d, 1H) 6.85 (d, 2H) 7.05 (d, 2H) 7.35 (s, 1H) 7.55 (s, 2H) ppm.

(b) Immobilization of a Selector on Silica

Kromasil 100—3.5 μm (purchased from Eka Chemicals, Bohus, Sweden) was modified by refluxing in toluene with 3-mercaptopropyl trimethoxysilane (ABCR, Karlsruhe, Germany) (elemental analysis of the modified particles: 4.58% C, 1.0% H).

Subsequently, (S)—N-DCB-O-allyl-Tyr was covalently attached to said thiol-modified sorption agent by a radical addition reaction following a standard procedure [M. Lämmerhofer and W. Lindner, J. Chromatogr. A, 741 (1996) 33]. An elemental analysis of the chirally modified silica particles yielded the following results: 15.19% C, 1.73% H, 0.64% N, for CSP 1 with the N-DCB-O-allyl-Tyr selector (corresponding to an average SO-occupancy of 0.44 mmol SO/g CSP).

Example 2

Synthesis of a Strong Chiral Cation Exchanger Based on (R)—N-(4-allyloxy-3,5-dichlorobenzoyl)-1-amino-3-methylbutane phosphonic acid, N-(4-allyloxy-DCB)-LeuP (a) Synthesis of a Selector of the Cation-Exchange Type For a synthesis of 4-allyloxy-3-5-dichlorobenzoic acid chloride, 9.7 mmol 3,5-dichloro-4-hydroxybenzoic acid (Acros Organics, Geel, Belgium), 20 mmol potassium hydroxide and 11.6 mmol allyl bromide (Aldrich) were refluxed in ethanol for 24 hours. Upon the hydrolysis of ester by-products with 1.8 M of a potassium hydroxide solution, the carboxylic acid was precipitated by acidification with 2M HCl. Recrystallization from petroleum ether-methanol produced the pure carboxylic acid at a yield of 92%. An aliquot of 0.5 mmol was then refluxed with thionyl chloride for 3 hours, evaporated to dryness, and the remaining acid chloride was dissolved in dry dioxane for a subsequent reaction with the aminophosphonic acid.

0.5 mmol (R)-1-amino-3-methylbutane phosphonic acid, the phosphonic acid analog of L-leucine, L-LeuP (regarding synthesis, cf. elsewhere F. Hammerschmidt and F. Wuggenig, Tetrahedron Asymmetr., 10 (1999) 1709), was suspended in 10 ml of dry dioxane. After adding 1.5 mmol N,O-Bis-trimethylsilyl acetamide (BSA, Aldrich) the mixture was heated for 3 hours at 70° C. until a clear solution was obtained. Thereupon, 0.5 mmol N-ethyl-diisopropylamine was added, followed by a dropwise addition of 0.5 mmol 4-allyloxy-3,5-dichlorobenzoic acid chloride under ice cooling. The reaction mixture was slowly raised to room temperature. The evaporation of the solvent after 4 hours of stirring and clean-up of the crude product by flash chromatography with silica and chloroform-methanol eluents at increasing volumetric contents of methanol produced the pure product at a yield of 50%.

$^1$H NMR (DMSO) δ 0.85 (d, 6H) 1.4–1.7 (m, 3H) 4.3 (q, 1H) 4.6 (d, 2H) 5.3 (d, 1H) 5.45 (d, 1H) 6.1 (m, 1H) 8.0 (s, 2H) 8.45 (d, 1H)

(b) Immobilization of SO: Same as in Example 1b

An elemental analysis of the chirally modified silica particles (see FIG. 1) yielded the following results: 8.02% C, 1.25% H, 0.3% N, for CSP 2 with the N-(4-allyloxy-DCB)-LeuP selector (corresponding to an SO-occupancy of 0.21 mmol SO/g CSP).

Example 3

Use of Materials of Examples 1 and 2 for the Enantiomer Separation of Chiral Bases (a) Comparison Strong Versus Weak Chiral Cation Exchangers It was assumed that the replacement of the carboxylic acid function of the selector by a phosphonic acid group as the primary ionic interaction site was favourable in terms of SO-SA binding enthalpies and enantioselectivities. The data as shown in Table 1 of a non-aqueous cation-exchange capillary electrochromatography (NA-CEC) confirm the higher enantioselectivity of the strong cation exchanger (CSP 2, material of Example 2, based on an N-(4-allyloxy-DCB)-LeuP selector) in comparison with the weak counterpart (CSP 1, material of Example 1, based on (S)—N-DCB-O-allyl-Tyr).

TABLE 1

Enantioselectivities of a few basic analytes on CSP 1 and CSP 2.[a]

| Analytes | $t_{R1}$ (min) | $t_{R2}$ (min) | $\alpha^b$ | $R_s$ | $N_1(m^{-1})$ | $N_2(m^{-1})$ |
|---|---|---|---|---|---|---|
| CSP 1 | | | | | | |
| Quinine/quinidine | 13.19 | 15.12 | 1.21 | 3.70 | 45900 | 49400 |
| Mefloquine | 13.40 | 13.85 | 1.05 | 1.01 | 65400 | 59700 |
| Metoprolol | 11.10 | | 1.00 | — | 37500 | |
| Atenolol | 14.41 | | 1.00 | — | 44000 | |
| CSP 2 | | | | | | |
| Quinine/quinidine | 13.48 | 15.37 | 1.23 | 4.53 | 62800 | 93400 |
| Mefloquine | 22.49 | 25.07 | 1.15 | 3.16 | 61600 | 49000 |
| Metoprolol | 12.83 | 13.31 | 1.06 | 1.39 | 81500 | 100400 |
| Atenolol | 19.00 | 19.67 | 1.05 | 1.33 | 94400 | 95300 |

[a]Column dimensions: 250 (335) × 0.1 mm i.d., mobile phase: 50 mM 2-aminobutanol and 12 mM HCOOH in ACN - MeOH (80/20, % by vol.); T: 20° C.; tension: +15 kV; injection: +5 kV for 5 s
[b]$\alpha = k_{app2}/k_{app1}$; $k_{app} = (t_R - t_0)/t_0$; $t_0$(CSP 1) = 3.91 min; $t_0$ (CSP 2) = 4.90 min Table 1 clearly shows that cation exchanger with higher acidity yields markedly better results.

(b) Use of a Strong Chiral Cation Exchanger Based on an N-(4-allyloxy-DCB)-LeuP Selector (CSP 2) for the Enantiomer Separation of Different β-blockers by Non-Aqueous Capillary Electrochromatography (NA-CEC)

TABLE 2

NA-CEC enantioseparations of different β-blockers on CSP 2.[a]

| Analytes | $t_{R1}$ (min) | $t_{R2}$ (min) | $\alpha$ | $R_s$ | $N_1(m^{-1})$ | $N_2(m^{-1})$ |
|---|---|---|---|---|---|---|
| Talinolol | 25.16 | 26.37 | 1.06 | 1.68 | 80800 | 82000 |
| Bupranolol | 13.19 | 12.59 | 1.05 | 1.21 | 90200 | 117500 |
| Bunitrolol | 11.88 | 12.27 | 1.06 | 1.11 | 58000 | 91400 |
| Celiprolol | 14.01 | 14.44 | 1.05 | 1.20 | 97000 | 99500 |

TABLE 2-continued

NA-CEC enantioseparations of different β-blockers on CSP 2.[a]

| Analytes | $t_{R1}$ (min) | $t_{R2}$ (min) | $\alpha$ | $R_s$ | $N_1(m^{-1})$ | $N_2(m^{-1})$ |
|---|---|---|---|---|---|---|
| Penbutolol | 15.09 | 15.67 | 1.06 | 1.46 | 94000 | 98000 |
| tert-Butyl-atenolol | 19.14 | 20.07 | 1.06 | 1.75 | 90200 | 85400 |
| tert-Butyl-metoprolol | 12.96 | 13.58 | 1.07 | 2.02 | 119300 | 126000 |
| tert-Butyl-propanolol | 14.88 | 15.60 | 1.07 | 1.95 | 110100 | 105100 |
| Atenolol[b] | 19.00 | 19.67 | 1.05 | 1.33 | 94400 | 95300 |
| Metoprolol | 12.84 | 13.31 | 1.06 | 1.39 | 81500 | 100400 |
| Propranolol | 15.12 | 15.44 | 1.03 | 0.67 | 58100 | 67600 |
| Acebutolol | 13.17 | 13.47 | 1.03 | 0.7 | 64200 | 63200 |
| Practolol | 16.85 | 17.44 | 1.05 | 1.30 | 91400 | 93200 |
| Alprenolol | 11.79 | 12.00 | 1.03 | 0.63 | 78000 | 90600 |
| Pindolol[c] | 15.99 | 16.39 | 1.04 | 0.95 | 88300 | 101400 |
| Mepindolol | 15.27 | 15.58 | 1.03 | 0.68 | 82200 | 73000 |
| Metipranolol | 11.34 | 11.56 | 1.03 | 0.59 | 53400 | 69200 |
| Normetoprolol[d] | 5.59 | 5.73 | 1.16 | 0.61 | 65200 | 29600 |
| Ethoxymethyl-metoprolol | 11.67 | 12.07 | 1.06 | 1.40 | 105200 | 116300 |
| Ethoxyethyl-metoprolol | 11.82 | 12.23 | 1.06 | 1.25 | 84000 | 96800 |
| 4-Methoxy-propranolol | 14.38 | 14.62 | 1.02 | 0.62 | 108600 | 76100 |
| 4-Hydroxy-propranolol | 24.22 | 24.54 | 1.02 | 0.42 | — | — |
| O-Allyl-propranolol | 11.15 | 11.43 | 1.04 | 0.96 | 84000 | 115400 |
| Oxprenolol | 11.38 | 11.65 | 1.04 | 0.79 | 52200 | 106200 |
| Carazolol | 16.88 | 17.15 | 1.02 | 0.59 | 126400 | 73400 |
| Sotalol | 13.92 | 14.44 | 1.06 | 1.49 | 100500 | 108200 |
| Nifenalol | 10.41 | 10.88 | 1.09 | 1.11 | 33400 | 53100 |

[a]Conditions see Table 2, $t_0$ (acetone) = 4.9 min
[b]enantiomer eluted first: (S)
[c]enantiomer eluted first: (—)
[d]Eluent: 50 mM 2-aminobutanol and 4 mM HCOOH in ACN - MeOH (80:20, % by vol.); $t_0$ (acetone) = 4.78 min (c) Use of a Strong Chiral Cation Exchanger Based on an N-(4-allyloxy-DCB)-LeuP Selector (CSP 2) for the Enantiomer Separation of Different Basic Drug Compositions by Non-Aqueous Capillary Electrochromatography (NA-CEC)

TABLE 3

NA-CEC enantioseparations of different basic analytes on CSP 2.[a]

| Analytes | $t_{R1}$ (min) | $t_{R2}$ (min) | $\alpha$ | $R_s$ | $N_1(m^{-1})$ | $N_2(m^{-1})$ |
|---|---|---|---|---|---|---|
| Propafenone[b] | 11.34 | 11.58 | 1.04 | 0.64 | 55600 | 62400 |
| Norpropafenone[b] | 5.46 | 5.57 | 1.11 | 0.73 | 82400 | 99800 |
| Bamethane[b] | 25.28 | 26.33 | 1.05 | 1.05 | 51000 | 37500 |
| Ephedrine[b] | 26.16 | 26.42 | 1.01 | 0.41 | — | — |
| Mefloquine[b] | 22.49 | 25.07 | 1.15 | 3.16 | 61600 | 49000 |
| Quinidine/quinine[b] | 13.48 | 15.37 | 1.23 | 4.53 | 62800 | 93500 |
| Oxyphencyclimine[b] | 20.61 | 21.59 | 1.06 | 2.15 | 134700 | 138400 |
| Etidocaine[c] | 16.13 | 16.49 | 1.03 | 1.51 | 254000 | 360200 |
| Bupivacaine[d] | 14.18 | 14.42 | 1.03 | 0.9 | 192000 | 187800 |
| Troeger's base[d] | 6.59 | 6.70 | 1.08 | 0.77 | 150000 | 100000 |
| Promethazine[d] | 19.80 | 20.19 | 1.03 | 1.46 | 361000 | 375800 |
| Dixyrazine[d] | 20.29 | 20.46 | 1.01 | 0.38 | — | — |
| Pheniramine[d] | 13.58 | 13.82 | 1.03 | 0.58 | 103800 | 50800 |
| Doxylamine[d] | 13.18 | 14.42 | 1.16 | 0.79 | 3900 | 14200 |
| Benzetimide[e] | 8.25 | 8.36 | 1.04 | 0.52 | 192600 | 65000 |
| Camylofine[e] | 11.86 | 12.17 | 1.05 | 0.48 | 40000 | 14000 |

TABLE 3-continued

NA-CEC enantioseparations of different basic analytes on CSP 2.[a]

| Analytes | $t_{R1}$ (min) | $t_{R2}$ (min) | α | $R_s$ | $N_1(m^{-1})$ | $N_2(m^{-1})$ |
|---|---|---|---|---|---|---|
| Lorazepame[f] | 7.60 | 7.79 | 1.08 | 0.7 | 58600 | 50600 |
| O-(tert-Butyl-carbamoyl)-Mefloquine[f] | 6.78 | 9.34 | 2.21 | 15.28 | 85200 | 53400 |

[a]Tension: +15 kV, electrolytes: See footnote b–f, regarding other conditions, see Table 2;
[b]50 mM 2-aminobutanol, 12 mM HCOOH; $t_0$ (acetone) = 4.90 min
[c]10 mM TEOA, 100 mM HCOOH; $t_0$ (acetone) = 4.99 min
[d]10 mM 2-aminobutanol, 100 mM HCOOH; $t_0$ (acetone) = 5.41 min
[e]10 mM 2-aminobutanol, 2.4 mM HCOOH; $t_0$ (acetone) = 5.71 min
[f]50 mM TEOA, 5 mM AcOH; tension: +25 kV; $t_0$ (acetone) = 5.32 min Tables 2 and 3 clearly illustrate the wide spectrum of applicability of the cation exchangers according to the invention for chiral bases of different kinds.

Example 4

Synthesis of a Strong Chiral Cation Exchanger Based on (R)—N-(4-allyloxy-3,5-dichlorobenzoyl)-2-amino-3,3-dimethylbutane Sulfonic Acid (a) Synthesis of the Selector:

The chiral selector based on sulfonic acid was synthesized according to the process as described in Example 2a by N-acylation of (R)-2-amino-3,3-dimethylbutane sulfonic acid, with 4-allyloxy-3,5-dichlorobenzoic acid chloride being used. After the evaporation of the solvent, the product was isolated from the crude reaction mixture by preparative chromatography on a chiral stationary phase based on tert-butylcarbamoyl quinidine ($d_p$=15 µm; column dimensions: 250×16 mm ID; eluent: methanol-1.5 M ammonium acetate (80:20, % by vol.) (pH$_a$=6.0); flow rate: 6 m/min, room temperature). The pure fraction of the chromatographic passage was desalinated on a cation exchanger (Dowex 50W, water as eluent). The eluate was evaporated, whereby the pure product was formed.

$^1$H NMR (D$_2$O) δ 7.6 (s, 2H), 6.0 (m, 1H), 5.25 (d, 1H), 5.1 (d, 1H), 4.45 (d, 2H), 4.1 (d, 1H), 2.7–3.2 (m, 2H), 0.75 (s, 9H) ppm.

(b) Immobilization of SO on Thiol-Modified Kromasil 100—3.5 µm:

A similar process as described in Example 1b was employed, however, a water-methanol mixture (80:20, % by vol.) was used as the solvent and 2,2'-azobis(2-amidinopropane)dihydrochloride was used as the initiator.

100 mg of a selector was dissolved in 3 ml of a water-methanol mixture (80:20, % by vol.). 200 mg of 3-thiolpropyl-modified Kromasil 100—3.5 µm was suspended in said solution, and 10 mg of a water-soluble initiator, 2,2'-azobis(2-amidinopropane)dihydrochloride, was added. The mixture was sonicated for 15 minutes and flushed with N$_2$ for 10 minutes. The radical addition reaction was allowed to continue over night (24 h) at 50° C. Thereupon, the modified silica was isolated and washed with different solvent.

An elemental analysis of the chirally modified silica particles yielded the following results: 10.06% C, 1.62% H (corresponding to an SO-occupancy of 0.29 mmol SO/g CSP).

(c) Test Chromatogram: Seperation of Clenbuterol Entantiomers

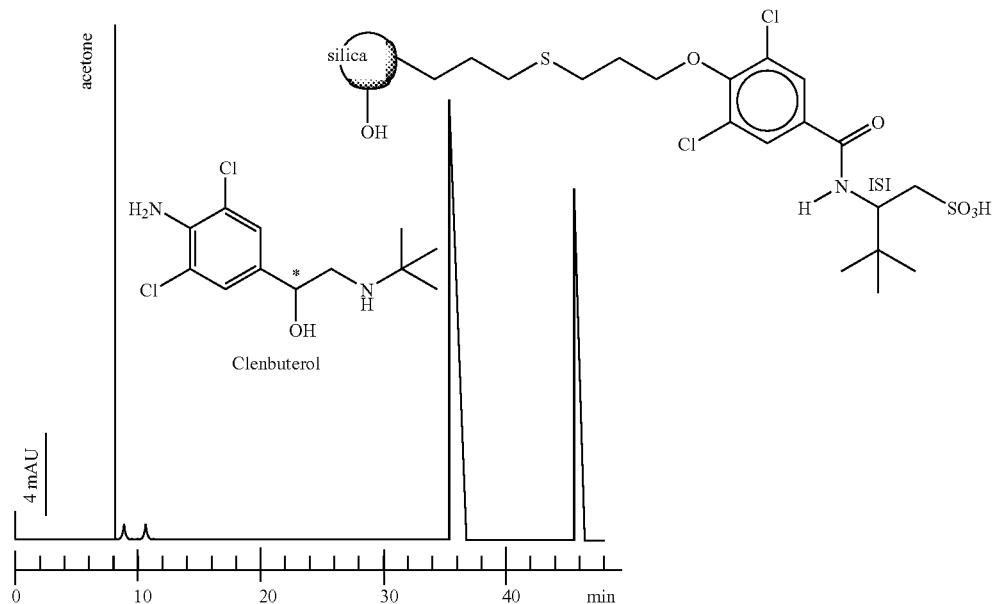

Separation of enantiomers of clenbuterol on a strong chiral cation exchanger based on β-aminosulfonic acid by NA-CEC.

Column dimensions: 250×0.1 mm I.D. (L$_{eff}$=250 mm, L$_{tot}$=335 mm), eluent: 50 mmol/L formic acid and 25 mmol/L 2-aminobutanol in acetonitrile-methanol (80:20, % by vol.); tension: +15 kV (18.2 µA); temperature: 20° C.

(d) Electrochromatographic Results:

TABLE 4 separation of enantiomers of different chiral bases by NA-CEC
Test conditions: CSP: (S)-N-(4-allyloxy-3,5-dichlorobenzoyl)-2-amino-3,3-dimethylbutane sulfonic acid, immobilized on 3-mercaptopropyl-modified Kromasil 100 3.5 μm; Capillary dimensions: $L_{tot}$ 33.5 cm, $L_{eff}$ 25.0 cm, $L_{packed}$ 25.0 cm; eluent: 25 mM 2-amino-1-butanol and 50 mM formic acid in acetonitrile-methanol (80:20, % by vol.); tension: +15 kV; T: 20° C.

| Compound | $t_{R1}$ | $t_{R2}$ | α | $R_S$ | $N_1$ | $N_2$ | e.o.[a] |
|---|---|---|---|---|---|---|---|
| Ephedrine | 25.84 | 27.60 | 1.10 | 3.64 | 47176 | 50190 | (L) |
| Nifenalol | 40.64 | 48.03 | 1.23 | 8.37 | 51065 | 33970 | — |
| Bamethane | 34.26 | 35.25 | 1.04 | 1.69 | 57759 | 56195 | — |
| Sotalol | 32.06 | 33.46 | 1.06 | 2.59 | 57999 | 59337 | (−) |
| Atenolol | 41.67 | 42.24 | 1.02 | 0.7 | 39748 | 44487 | — |
| tert-Butyl-Atenolol | 38.87 | 40.15 | 1.04 | 1.82 | 50618 | 51427 | — |
| Propafenone | 21.93 | 22.78 | 1.06 | 2.05 | 45393 | 47245 | (S) |
| Talinolol | 63.70 | 65.93 | 1.04 | 1.62 | 36951 | 34133 | — |
| Bupranolol | 23.99 | 24.93 | 1.06 | 2.22 | 52401 | 55085 | — |
| Celiprolol | 30.78 | 32.44 | 1.07 | 2.8 | 45394 | 45815 | — |
| Bunitrolol | 24.44 | 25.65 | 1.08 | 2.67 | 48931 | 48769 | — |
| Practolol | 41.42 | 41.86 | 1.01 | 0.59 | 52792 | 49845 | — |
| Oxprenolol | 17.93 | 18.28 | 1.04 | 0.96 | 31350 | 52185 | — |
| Metipranolol | 21.91 | 22.31 | 1.03 | 0.95 | 41433 | 45335 | — |
| Alprenolol | 23.22 | 23.78 | 1.04 | 1.37 | 48425 | 56473 | — |
| Penbutolol | 23.32 | 24.33 | 1.07 | 1.59 | 22402 | 21938 | (S) |
| Isopenbutolol | 24.93 | 25.91 | 1.06 | 2.18 | 50075 | 52309 | (S) |
| Isopenbutolol | 27.80 | 29.17 | 1.07 | 2.63 | 49773 | 47004 | (S) |
| Carazolol | 36.48 | 37.20 | 1.03 | 1.13 | 50456 | 55998 | — |
| Pindolol | 26.12 | 26.65 | 1.03 | 1.07 | 40194 | 54403 | — |
| Mepindolol | 26.62 | 27.16 | 1.03 | 1.17 | 54292 | 55592 | — |
| Acebutolol | 32.72 | 33.91 | 1.05 | 2.03 | 50314 | 53015 | — |
| Propranolol | 29.19 | 29.70 | 1.03 | 0.97 | 50181 | 49762 | — |
| tert-Butyl-Propranolol | 31.55 | 33.02 | 1.06 | 2.6 | 50639 | 54365 | — |
| 4-Methoxy-Propranolol | 32.47 | 33.10 | 1.03 | 1.08 | 49874 | 52499 | — |
| tert-Butyl-Propranolol | 31.87 | 33.25 | 1.06 | 2.41 | 51663 | 51952 | — |
| O-Allyl-Propranolol | 18.54 | 18.98 | 1.04 | 1.33 | 48899 | 55906 | — |
| 4-Hydroxy-Propranolol | 40.21 | 41.15 | 1.03 | 1.26 | 44240 | 51540 | (S) |
| Metoprolol | 25.17 | 25.47 | 1.02 | 0.63 | 41944 | 45582 | — |
| tert-Butyl-Metoprolol | 22.29 | 22.94 | 1.04 | 1.21 | 31978 | 25712 | — |
| Ethoxymethylmetoprolol | 25.04 | 25.24 | 1.01 | 0.47 | 56982 | 50222 | — |
| Ethoxyethylmetoprolol | 24.19 | 24.40 | 1.01 | 0.5 | 56136 | 54812 | — |
| Benzetimide | 23.83 | 25.43 | 1.10 | 3.43 | 44234 | 45678 | (R) |
| Etidocaine | 11.63 | 11.87 | 1.07 | 0.86 | 37017 | 21999 | — |
| Mefloquine (MQ) | 69.16 | 89.49 | 1.33 | 12.02 | 35279 | 35366 | — |
| O-(tert-Butylcarbamoyl)-MQ | 33.45 | 48.98 | 1.62 | 29.99 | 36271 | 347589 | — |
| Pantoprazol | 10.87 | 11.34 | 1.16 | 1.77 | 27833 | 27272 | — |
| Omeprazol | 13.29 | 14.29 | 1.20 | 2.51 | 22914 | 16727 | — |
| N-Deisopropyl-disopyramide | 20.45 | 21.05 | 1.05 | 1.23 | 23600 | 38233 | — |
| Disopyramide | 9.30 | 9.46 | 1.14 | 0.51 | 8199 | 30576 | — |
| Phenmetazine | 41.10 | 43.44 | 1.07 | 2.59 | 39513 | 31802 | — |
| Sulpiride | 15.71 | 16.14 | 1.05 | 0.96 | 15706 | 28631 | — |
| 1-(2,4-Dichlorphenyl)-2-(1-imidazolyl)-ethanol | 14.66 | 15.12 | 1.07 | 0.84 | 6212 | 28440 | — |
| Tryptophanamide | 49.54 | 51.94 | 1.06 | 0.71 | 3247 | 4054 | — |
| Tramadol | 10.82 | 11.14 | 1.11 | 1.03 | 15394 | 26872 | — |
| Metanephrine | 31.34 | 32.01 | 1.03 | 1.18 | 48333 | 52128 | — |
| 1-(1-Naphtyl)ethylamine | 41.10 | 42.93 | 1.06 | 2.56 | 29837 | 140023 | — |
| Pronethanol | 31.83 | 34.91 | 1.13 | 5.4 | 53692 | 56179 | — |
| Butizide | 10.71 | 10.88 | 1.06 | 0.65 | 28546 | 26692 | — |
| Isoxsuprine | 24.93 | 27.90 | 1.18 | 5.91 | 41895 | 46861 | (+) |
| Miconazol | 12.03 | 12.35 | 1.07 | 0.77 | 14667 | 13197 | — |
| Dipivefrine | 25.99 | 26.92 | 1.05 | 1.98 | 49295 | 52467 | — |
| Terfenadine | 26.47 | 26.82 | 1.02 | 0.64 | 34893 | 40932 | — |
| Eprazinone | 10.28 | 10.57 | 1.10 | 1.15 | 25619 | 27507 | — |
| Salbutamol | 42.27 | 47.28 | 1.14 | 6.82 | 94682 | 42474 | — |
| Orciprenaline | 52.42 | 54.27 | 1.04 | 1.71 | 10462 | 37463 | — |

TABLE 4-continued separation of enantiomers of different chiral bases by NA-CEC
Test conditions: CSP: (S)-N-(4-allyloxy-3,5-dichlorobenzoyl)-2-amino-3,3-
dimethylbutane sulfonic acid, immobilized on 3-mercaptopropyl-modified Kromasil 100
3.5 µm; Capillary dimensions: $L_{tot}$ 33.5 cm, $L_{eff}$ 25.0 cm, $L_{packed}$ 25.0 cm; eluent: 25 mM
2-amino-1-butanol and 50 mM formic acid in acetonitrile-methanol (80:20, % by vol.);
tension: +15 kV; T: 20° C.

| Compound | $t_{R1}$ | $t_{R2}$ | α | $R_S$ | $N_1$ | $N_2$ | e.o.[a] |
|---|---|---|---|---|---|---|---|
| Terbutaline | 52.77 | 57.79 | 1.11 | 6.2 | 80914 | 70211 | — |
| Clenbuterol | 36.43 | 45.92 | 1.33 | 14.18 | 58876 | 62213 | — |
| Mebeverine | 11.38 | 11.78 | 1.13 | 0.97 | 9955 | 15880 | — |
| Hydroxyzine | 15.35 | 15.55 | 1.03 | 0.58 | 25654 | 35311 | — |
| Flecainide | 18.44 | 18.93 | 1.05 | 1.39 | 43394 | 45500 | — |
| Flupentixol | 25.52 | 28.30 | 1.15 | 5.77 | 50729 | 49296 | — |
| Rimiterol | 55.13 | 59.77 | 1.10 | 2.77 | 19330 | 18537 | — |
| Oxyphencyclimine | 10.19 | 10.36 | 1.08 | 0.57 | 12765 | 28711 | — |

[a]stereochemical descriptor (absolute configuration, optical rotation) of the first eluted enantiomer The results of Table 4 provide strong evidence for the extremely wide spectrum of applicability of the strong enantioselective cation exchangers of the present invention. The invented principle of separation thus represents a tool which may be regarded as generally applicable to the enantiomer separation of chiral basic compounds and—such as illustrated by the example of tryptophanamide—also of amino acids and peptides.

Example 5

Comparison of the Chromatographic Behaviour of Weak and Strong Chiral Cation Exchangers Based on β-aminocarboxylic, Phosphonic and Sulfonic Acids

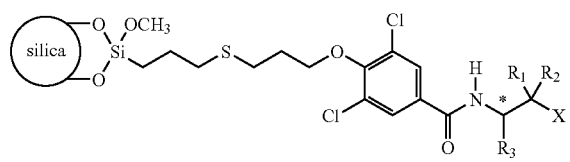

CSP 3: X=COOH, $R_1$=$R_2$=H, $R_3$=tert-butyl, (S)-configuration
CSP 4: X=SO$_3$H, $R_1$=$R_2$=H, $R_3$=tert-butyl, (S)-configuration
CSP 5: X=SO$_3$H, $R_1$=$R_2$=H, $R_3$=COOH, (R)-configuration
CSP 6: X=SO$_3$H, $R_1$=$R_2$=CH$_3$, $R_3$=COOH
CSP 7: X=PO$_3$H$_2$, $R_1$=$R_2$=H, $R_3$=tert-butyl
* denotes a stereogenic centre which either is R or S

TABLE 5

NA-CEC-enantioseparations of different basic compounds.[a]

| Analytes | CSP 3 | | CSP 4 | | CSP 5 | |
|---|---|---|---|---|---|---|
| | α | $R_s$ | α | $R_s$ | α | $R_s$ |
| Mefloquine (MQ) | 1.10 | 4.87 | 1.29 | 12.02 | | |
| MQ-tert-butyl-carbamate | 1.13 | 4.25 | 1.46 | 29.99 | | |
| Ephedrine | 1.00 | 0.00 | 1.07 | 3.64 | 1.01 | 0.20 |
| Sotalol | 1.00 | 0.00 | 1.04 | 2.59 | 1.01 | 0.60 |
| Propafenone | 1.00 | 0.00 | 1.04 | 2.05 | 1.00 | 0.00 |
| Rimiterol | 1.00 | 0.00 | 1.08 | 2.77 | 1.01 | 0.32 |
| Bunitrolol | 1.00 | 0.00 | 1.05 | 2.67 | 1.00 | 0.00 |
| Benzetimide | 1.02 | 0.64 | 1.07 | 3.43 | 1.00 | 0.00 |
| Clenbuterol | 1.03 | 1.34 | 1.26 | 14.18 | 1.03 | 1.82 |
| Nifenalol | 1.05 | 2.40 | 1.18 | 8.37 | 1.02 | 0.95 |

[a]Column dimensions: 250 × 0.1 mm I.D. ($L_{eff}$ = 250 mm, $L_{tot}$ = 335 mm), eluent: 50 mmol/L formic acid and 25 mmol/L 2-aminobutanol in acetonitrile - methanol (80:20, % by vol.); tension: +15 kV; temperature: 20° C.

A direct comparison of carboxylic (CSP 3) and sulfonic acid counterparts (CSP 4) (Table 5) clearly shows the substantially increased enantioseparation capability of the stronger cation exchanger such as indicated by the dissolution values ($R_s$) which, in all test samples, are higher for CSP 4.

Example 6

Synthesis of a Peptide-Derived Selector or CSP, Respectively

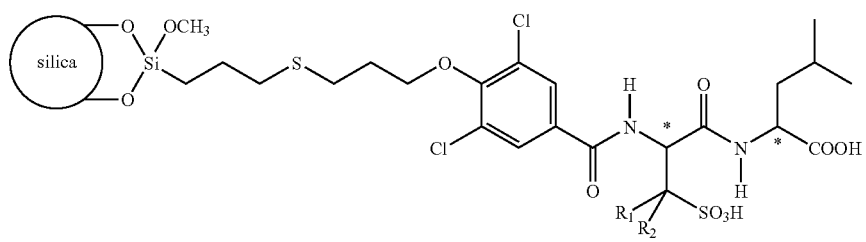

(a) Oxidation of (Cys-Leu)₂ to the Respective Sulfonic Acid Dipeptide

A performic acid solution is freshly prepared by mixing 0.5 ml of $H_2O_2$ (30% in water) with 9.5 ml of formic acid for 2 hours at room temperature. The oxidized dimeric (Cys-Leu)₂ dipeptide is dissolved in formic acid-methanol (5:1, % by vol.) (40 mg/ml). The 2 solutions are cooled down to 0° C., whereupon the peptide solution is added dropwisely to the performic acid. The solution is then stirred for 2.5 hours at 0° C. In order to stop the reaction, ice is added to the reaction mixture. Thereupon, the solvent is removed by evaporation.

(b) Acylation with 4-allyloxy-3,5.-dichlorobenzoic Acid Hydroxysuccinimide Ester 0.5 mmol of the sulfonic acid dipeptide was dissolved in 25 ml of water under vigorous stirring. 7 mmol $NaHCO_3$ dissolved in 10 ml of water and 0.7 mmol 4-allyloxy-3,5-dichlorobenzoic acid hydroxysuccinimide ester were added successively. The reaction mixture was vigorously stirred for 16 hours at room temperature. After the evaporation of the solvent, the product was isolated from the crude reaction mixture by preparative chromatography on a chiral stationary phase based on tert-butylcarbamoyl quinidine ($d_p$=15 μm; column dimensions: 250×16 mm ID; eluent: methanol-1.5 M ammonium acetate (80:20, % by vol.) ($pH_a$=6.0); flow rate: 6 ml/min, room temperature). The pure fraction of the chromatographic passage containing the product was evaporated to dryness, dissolved in water and desalinated on a cation exchanger (Dowex 50W, water as eluent). The eluate was evaporated to dryness, whereby the pure N-(4-allyloxy-3,5-dichlorobenzoyl)-CySO₃H-Leu-dipeptide product was formed.

(b) Immobilization of SO on Thiol-Modified Kromasil 100—3.5 μm: see Example 4b.

Example 7

Determination of $pK_a$ Values (Based on Aqueous Conditions, $pK_{a\ aq}$)

(a) Under Aqueous Conditions 1 mmol of acid is dissolved in 100 ml of water and titrated by potentiometric titration with 0.1 mol/l of an NaOH solution. The pK is determined by aligning the titration curve with the experimental data, providing the pK for the curve with the best alignment.

(b) Under Mixed Aqueous-Organic Conditions $pK_a$-values of selectors which are not soluble under purely aqueous conditions were titrated at 24° C. with a Sirius titrator of Sirius Analytical Instruments Ltd (East Sussex, UK) at different methanol-water ratios. The $pK_a$ values, which are comparable to the values of Example 7a, were then obtained by back-extrapolation to zero percent organic auxiliary solvent, using the Yasuda-Shedlovsky method.

Example 8

Synthesis of Chiral Organic Cation-Exchange Polymer Beads

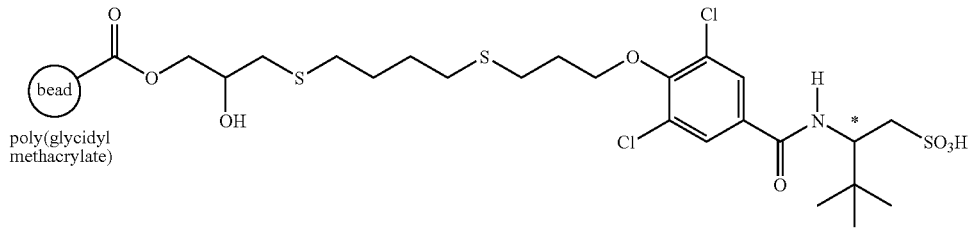

poly(glycidyl methacrylate)

(a) Thiol-Modified Polymethacrylate Beads 10 g of poly(glycidylmethacrylate-co-ethylene dimethacrylate)polymer beads (Suprema 1000u) were suspended in 100 ml of methanol and ultra-sonicated for 10 minutes in order to break up all aggregates and obtain a homogeneous suspension. The suspension was transferred to a flask equipped with a mechanical stirrer. 80 mmol (=9.4 ml) of 1,4-butanedithiol and 80 mmol (=4.48 g) of potassium hydroxide dissolved in 30 ml of methanol were added. The reaction mixture was stirred for 72 hours at room temperature under a nitrogen atmosphere. Thereupon, the polymer particles were filtered, thoroughly washed with methanol, THF, chloroform and diethyl ether (twice in each case) and dried. An elemental analysis yielded 8.0% (% by weight) S, which is equal to an occupancy of 1.25 mmol thiol/g polymer.

(b) Immobilization of (R)—N-(4-allyloxy-3,5-dichlorobenzoyl)-2-amino-3,3-dimethylbutane sulfonic acid on Thiol-Modified Organic Polymer Beads 0.5 g of thiol-modified polymer particles were suspended in 25 ml of a water-methanol mixture (80:20, % by vol.), ultra-sonicated for 10 minutes and transferred to a flask equipped with a mechanical stirrer and a condensation cooler. 300 mg of (R)—N-(4-allyloxy-3,5-dichlorobenzoyl)-2-amino-3,3-dimethylbutane sulfonic acid and 30 mg of 2,2'-azobis(2-amidinopropane)dihydrochloride as the initiator were added. The reaction mixture was refluxed for 18 hours under a nitrogen atmosphere. The particles were thoroughly washed with water-methanol, methanol, chloroform, diethyl ether and dried. An elemental analysis yielded a selector occupancy of 102 μmol/g polymer.

The invention claimed is:

1. An enantioselective cation-exchange material, comprising a chiral selector comprising a chiral component and at least one cation-exchange group, a spacer and a carrier, wherein
the chiral component has a molecular weight of less than 1,000 and comprises a π—π interaction site and wherein the at least one cation-exchange group is an acid group having a pKa<4.0.

2. An enantioselective cation-exchange material according to claim 1, wherein the acid group has a pKa<3.5.

3. An enantioselective cation-exchange material according to claim 2, wherein the acid group has a pKa<2.5.

4. An enantioselective cation-exchange material according to any of claims 1–3, wherein the acid group is a sulfonic, sulfinic, phosphoric, phosphonic or phosphinic group.

5. An enantioselective cation-exchange material, according to claim 1, wherein the acid group is a sulfonic, sulfinic, phosphoric, phosphonic, phosphinic, boronic, amidophosphonic or amidosulfonic group.

6. An enantioselective cation-exchange material, according to claim 1, wherein said carrier comprises a member selected from the group consisting of silicon beads, poly(meth)acrylate polymer beads, poly(meth)acrylamide beads, poly(meth)acrylate monoliths, and polystyrene resins.

7. An enantioselective cation-exchange material, according to claim 1, wherein said carrier comprises a member selected from the group consisting of silica ($SiO_2$), alumina ($Al_2O_3$), zirconia ($ZrO_2$), titania (($TiO_2$), matrices produced by sol-gel technology, organic-inorganic silica-containing hybrid materials, polysiloxanes, poly(meth)acrylates, poly(meth)acrylamides, polystyrenes, styrene-(meth)acrylate plymers, ring-opening methathesis polymers, polysaccharides, and agarose.

8. An enantioselective cation-exchange material, according to claim 7, wherein said carrier is in the form of a bend, monolithic or continuous material, nanoparticle, membrane, resin or surface-limited layer.

9. An enantioselective cation-exchange material, according to claim 1, wherein said spacer is of the formula:

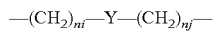

wherein Y is missing or is a member selected from the group consisting of:

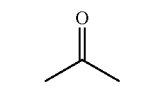
(a)

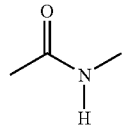
(b)

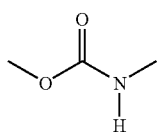
(c)

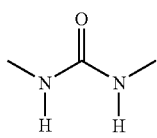
(d)

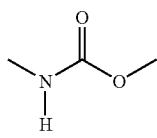
(e)

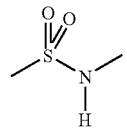
(f)

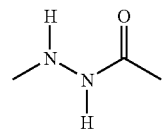
(g)

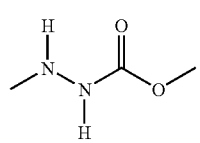
(h)

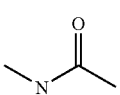
(i)

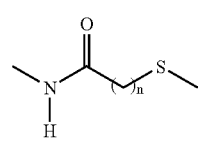
(j)

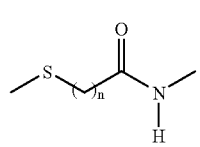
(k)

wherein n, ni and nj are each separately an integer between 1 and 18.

10. An enantioselective cation-exchange material, according to claim 1, wherein the acid group is a member selected from the group consisting of —COOH, —PO(OH)$_2$, —SO$_3$H, —OPO(OH)$_2$, —B(OH)$_2$, and —CH$_2$—SO$_3$H.

11. An enantioselective cation-exchange material which comprises a chiral selector comprising a chiral component and at least one cation-exchange group, a spacer end a carrier, wherein
(a) the chiral component has a molecular weight of less than 1,000 and comprises a π—π interaction site;
(b) the at least one cation exchange group is an acid group having a pKa<4.0 and comprised of a sulfonic, sulfinic, phosphoric, phosphonic, phosphinic, boronic, amidophosphonic or amidosulfonic group;
(c) said carrier comprises a member selected from the group consisting of silica ($SiO_2$), alumina ($Al_2O_3$), zirconia ($ZrO_2$), titania ($TiO_2$), matrices produced by sol-gel technology, organic-inorganic silica-containing hybrid materials, polysiloxanes, poly(meth)acrylates, poly(meth)acrylamides, polystyrenes, styrene-(meth)acrylate plymers, ring-opening methathesis polymers, polysaccharides, and agarose; and
(d) said spacer is of the formula

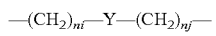

wherein Y is missing or is a member selected from the group consisting of:

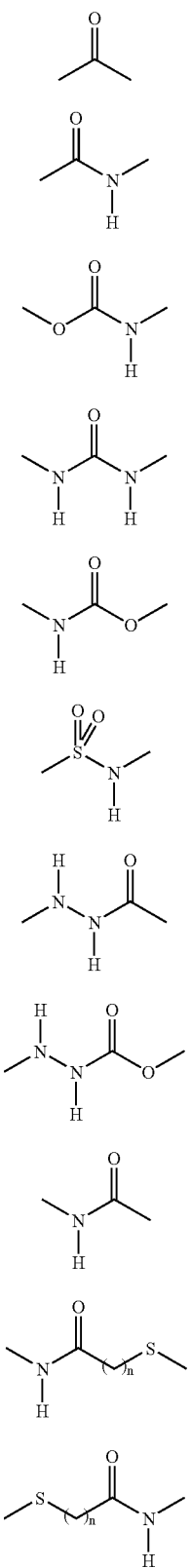

12. An enantioselective cation-exchange material according to claim 11, wherein the acid group has a pKa<2.5.

13. An enantioselective cation-exchange material according to claim 11, wherein said carrier is a member selected from the group consisting of silicon beads, poly(meth)acrylate polymer beads, poly(meth)acrylamide beads, poly(meth)acrylate monoliths, end polystyrene resins.

14. An enantioselective cation-exchange material which comprises a chiral selector comprising a chiral component and at least one cation-exchange group, a spacer and a carrier, wherein
  (a) the chiral component has a molecular weight of less than 1,000 and comprises a π—π interaction site;
  (b) the at least one cation-exchange group is an acid group having a pKa<4.0 comprised of a member selected from the group consisting of —COOH, —PO(OH)$_2$, —SO$_3$H, —OPO(OH)$_2$, —B(OH)$_2$, and —CH$_2$—SO$_3$H;
  (c) said carrier is a member selected from the group consisting of silicon beads, poly(meth)acrylate polymer beads, poly(meth)acrylamide beads, poly(meth)acrylate monoliths, and polystyrene resins;
  (d) said spacer is of the formula —(CH$_2$)$_{ni}$—Y—(CH$_2$)$_{nj}$— wherein Y is missing or is a member selected from the group consisting of:

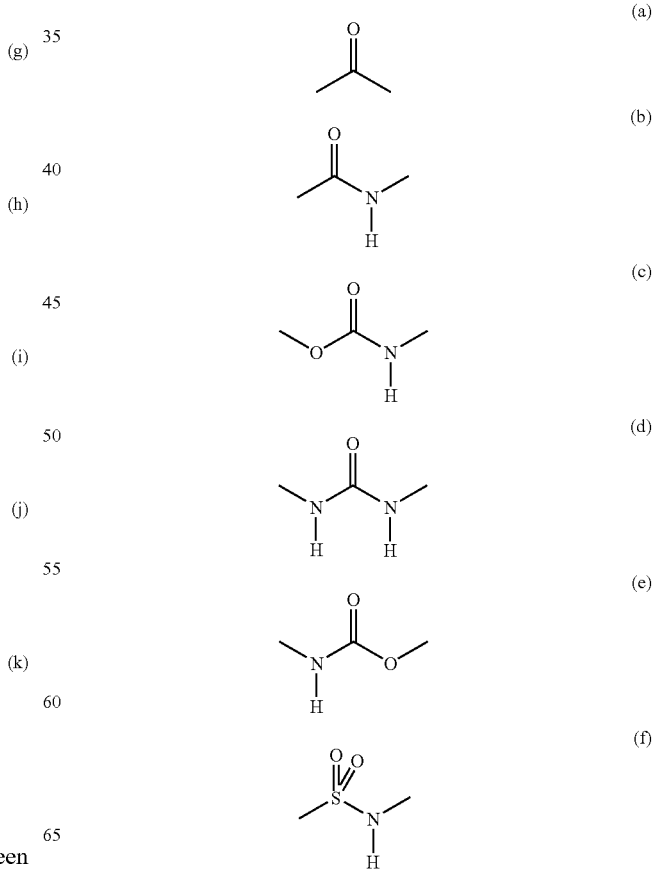

wherein n, ni and nj are each separately an integer between 1 and 18.

(g) 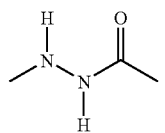
(h) 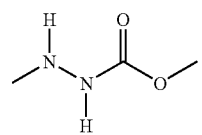
(i) 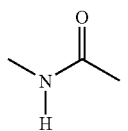
(j) 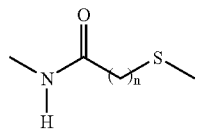
(k) 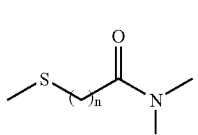
wherein n, ni and nj are each separately an integer between and 1 and 18.
* * * * *